US012812465B2

(12) United States Patent
Asterjadhi et al.

(10) Patent No.: US 12,812,465 B2
(45) Date of Patent: Nov. 24, 2026

(54) PACKET DUPLICATION FOR DATA FRAMES IN A WIRELESS LOCAL AREA NETWORK

(71) Applicant: QUALCOMM Incorporated, San Diego, CA (US)

(72) Inventors: Alfred Asterjadhi, San Diego, CA (US); George Cherian, San Diego, CA (US); Abhishek Pramod Patil, San Diego, CA (US); Gaurang Naik, San Diego, CA (US); Abdel Karim Ajami, San Diego, CA (US); Sai Yiu Duncan Ho, San Diego, CA (US); Yanjun Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 680 days.

(21) Appl. No.: 18/315,369

(22) Filed: May 10, 2023

(65) Prior Publication Data

US 2024/0381175 A1 Nov. 14, 2024

(51) Int. Cl.
*H04W 28/06* (2009.01)
*H04L 1/00* (2006.01)
(Continued)

(52) U.S. Cl.
CPC ......... *H04W 28/065* (2013.01); *H04L 1/0071* (2013.01); *H04L 1/1829* (2013.01); *H04L 47/32* (2013.01)

(58) Field of Classification Search
CPC ... H04W 28/02; H04W 28/06; H04W 28/065; H04L 1/004; H04L 1/0056; H04L 1/0071;
(Continued)

(56) References Cited

U.S. PATENT DOCUMENTS

2018/0324642 A1* 11/2018 Yu ..................... H04W 36/0055
2020/0274654 A1* 8/2020 Loehr ................... H04W 72/23
(Continued)

FOREIGN PATENT DOCUMENTS

WO WO-2021034155 A1 * 2/2021 ............ H04W 28/04
WO WO-2022005166 A1 * 1/2022 ............ H04W 84/12
(Continued)

OTHER PUBLICATIONS

Machine Translation of WO-2021034155-A1 (Year: 2021).*
(Continued)

*Primary Examiner* — Paul H. Masur
(74) *Attorney, Agent, or Firm* — Holland and Hart LLP

(57) ABSTRACT

This disclosure provides methods, components, devices and systems for packet duplication for data frames in a wireless local area network (WLAN). Some aspects more specifically relate to decoding duplicate packets that include data frames. An access point (AP) may transmit two or more physical layer protocol data units (PPDUs) that are duplicates of each other while operating in a duplicate data packet mode. A station (STA) may include one or more decoders configured to decode the duplicate PPDUs cumulatively or separately based on a decoding mode. The AP and the STA may exchange frames to dynamically enable or disable the duplicate data packet mode. The duplicate PPDUs may include one or more bits configured to indicate that the PPDU is a duplicate. The STA may decode at least one of the duplicate PPDUs and transmit a feedback message responsive to at least a portion of one of the duplicate PPDUs.

22 Claims, 12 Drawing Sheets

(51) Int. Cl.
*H04L 1/1829* (2023.01)
*H04L 47/32* (2022.01)

(58) Field of Classification Search
CPC . H04L 1/16; H04L 1/18; H04L 1/1829; H04L 47/10; H04L 47/32; H04L 1/08
See application file for complete search history.

(56) References Cited

U.S. PATENT DOCUMENTS

| | | | | |
|---|---|---|---|---|
| 2022/0060941 | A1* | 2/2022 | Suh | H04W 28/065 |
| 2022/0150015 | A1* | 5/2022 | Liu | H04L 5/0055 |
| 2023/0087449 | A1* | 3/2023 | Li | H04L 27/2605 370/329 |
| 2023/0291631 | A1 | 9/2023 | Chen et al. | |
| 2023/0412305 | A1 | 12/2023 | Noh et al. | |
| 2024/0235735 | A9* | 7/2024 | Lim | H04L 1/0068 |
| 2026/0122156 | A1* | 4/2026 | Gong | H04L 1/0042 |

FOREIGN PATENT DOCUMENTS

| | | | | |
|---|---|---|---|---|
| WO | WO-2023167499 A1 * | 9/2023 | | H04L 5/0091 |
| WO | WO-2024051312 A1 * | 3/2024 | | H04L 27/26 |

OTHER PUBLICATIONS

Machine Translation of WO-2022005166-A1 (Year: 2022).*
Machine Translation of WO-2023167499-A1 (Year: 2023).*
Machine Translation of WO-2024051312-A1 (Year: 2024).*
Partial International Search Report—PCT/US2024/022968—ISA/EPO—Jul. 3, 2024.
International Search Report and Written Opinion—PCT/US2024/022968—ISA/EPO—Aug. 26, 2024.

* cited by examiner

PACKET DUPLICATION FOR DATA FRAMES IN A WIRELESS LOCAL AREA NETWORK

TECHNICAL FIELD

This disclosure relates to wireless communication and, more specifically, to packet duplication for data frames in a wireless local area network (WLAN).

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

SUMMARY

The systems, methods, and devices of this disclosure each have several innovative aspects, no single one of which is solely responsible for the desirable attributes disclosed herein.

A method for wireless communication at a station is described. The method may include activating a duplicate data packet mode, receiving a first data frame and a second data frame, the second data frame including a duplicate of the first data frame upon activation of a duplicate data packet mode, decoding, using at least one decoder from among a set of multiple decoders of the station in accordance with the duplicate data packet mode, the first data frame and the second data frame, and transmitting, associated at least in part with the decoding, a feedback message responsive to at least a portion of the first data frame, the second data frame, or both.

In some embodiments, a station may include at least one memory, and at least one processor communicatively coupled with the at least one memory, the at least one processor operable to cause the station to activate a duplicate data packet mode, receive a first data frame and a second data frame, the second data frame including a duplicate of the first data frame upon activation of a duplicate data packet mode, decode, using at least one decoder from among a set of multiple decoders of the station in accordance with the duplicate data packet mode, the first data frame and the second data frame, and transmit, associated at least in part with the decoding, a feedback message responsive to at least a portion of the first data frame, the second data frame, or both.

In some embodiments, an apparatus for wireless communications at a station may include means for activating a duplicate data packet mode, means for receiving a first data frame and a second data frame, the second data frame including a duplicate of the first data frame upon activation of a duplicate data packet mode, means for decoding, using at least one decoder from among a set of multiple decoders of the station in accordance with the duplicate data packet mode, the first data frame and the second data frame, and means for transmitting, associated at least in part with the decoding, a feedback message responsive to at least a portion of the first data frame, the second data frame, or both.

In some embodiments, a non-transitory computer-readable medium may store code for wireless communication at a station, and the code may include instructions executable by a processor to activate a duplicate data packet mode, receive a first data frame and a second data frame, the second data frame including a duplicate of the first data frame upon activation of a duplicate data packet mode, decode, using at least one decoder from among a set of multiple decoders of the station in accordance with the duplicate data packet mode, the first data frame and the second data frame, and transmit, associated at least in part with the decoding, a feedback message responsive to at least a portion of the first data frame, the second data frame, or both.

In some examples of the method, apparatuses, and non-transitory computer-readable medium described herein, activating the duplicate data packet mode may include operations, features, means, or instructions for activating a non-high throughput (non-HT) duplicate data packet mode, the first data frame and the second data frame including non-HT physical layer (PHY) protocol data units (PPDUs) in accordance with the non-HT duplicate data packet mode.

In some examples of the method, apparatuses, and non-transitory computer-readable medium described herein, activating the duplicate data packet mode may include operations, features, means, or instructions for activating an ultra-high reliability (UHR) duplicate data packet mode, the first data frame and the second data frame including UHR PPDUs in accordance with the duplicate data packet mode.

Some examples of the method, apparatuses, and non-transitory computer-readable medium described herein may further include operations, features, means, or instructions for exchanging, in accordance with a duplicate mode negotiation procedure, one or more frames that may be configured to enable or disable the duplicate data packet mode, the one or more frames including control frames or management frames and activating the duplicate data packet mode associated at least in part with the one or more frames.

Some examples of the method, apparatuses, and non-transitory computer-readable medium described herein may further include operations, features, means, or instructions for receiving, via the second data frame, one or more bits that indicate the second data frame may be the duplicate of the first data frame in accordance with the duplicate data packet mode.

In some examples of the method, apparatuses, and non-transitory computer-readable medium described herein, receiving the first data frame and the second data frame may include operations, features, means, or instructions for receiving, via the first data frame, a first set of multiple aggregated medium access control (MAC) service data units (A-MSDUs) and a first set of multiple check sequences, each check sequence of the first set of multiple check sequences appended to a respective A-MSDU of the first set of multiple A-MSDUs and receiving, via the second data frame, a second set of multiple A-MSDUs and a second set of multiple check sequences, each check sequence of the second set of multiple check sequences appended to a respective A-MSDU of the second set of multiple A-MSDUs.

In some examples of the method, apparatuses, and non-transitory computer-readable medium described herein, receiving the first data frame and the second data frame may include operations, features, means, or instructions for receiving, via the first data frame, a first set of multiple A-MSDU subframes including data and one or more first null A-MSDU subframes interleaved with the first set of multiple A-MSDU subframes, the decoding of the first data frame performed at least in part during the one or more first null A-MSDU subframes and receiving, via the second data frame, a second set of multiple A-MSDU subframes including data and one or more second null A-MSDU subframes interleaved with the second set of multiple A-MSDU subframes, the decoding of the second data frame performed at least in part during the one or more second null A-MSDU subframes.

A method for wireless communication at an AP is described. The method may include receiving a request to enable a duplicate data packet mode, transmitting, associated at least in part with the request, signaling that enables the duplicate data packet mode, transmitting at least a first data frame, the first data frame including a duplicate of a second data frame in accordance with the duplicate data packet mode, and receiving a feedback message responsive to at least a portion of the first data frame, the second data frame, or both.

In some embodiments, an AP may include at least one memory, and at least one processor communicatively coupled with the at least one memory, the at least one processor operable to cause the AP to receive a request to enable a duplicate data packet mode, transmit, associated at least in part with the request, signaling that enables the duplicate data packet mode, transmit at least a first data frame, the first data frame including a duplicate of a second data frame in accordance with the duplicate data packet mode, and receive a feedback message responsive to at least a portion of the first data frame, the second data frame, or both.

In some embodiments, an apparatus for wireless communications at an AP may include means for receiving a request to enable a duplicate data packet mode, means for transmitting, associated at least in part with the request, signaling that enables the duplicate data packet mode, means for transmitting at least a first data frame, the first data frame including a duplicate of a second data frame in accordance with the duplicate data packet mode, and means for receiving a feedback message responsive to at least a portion of the first data frame, the second data frame, or both.

In some embodiments, a non-transitory computer-readable medium may store code for wireless communications at an AP, and the code may include instructions executable by a processor to receive a request to enable a duplicate data packet mode, transmit, associated at least in part with the request, signaling that enables the duplicate data packet mode, transmit at least a first data frame, the first data frame including a duplicate of a second data frame in accordance with the duplicate data packet mode, and receive a feedback message responsive to at least a portion of the first data frame, the second data frame, or both.

In some examples of the method, apparatuses, and non-transitory computer-readable medium described herein, transmitting the signaling may include operations, features, means, or instructions for transmitting the signaling to enable a non-HT duplicate data packet mode, the first data frame and the second data frame including non-HT PPDUs in accordance with the non-HT duplicate data packet mode.

In some examples of the method, apparatuses, and non-transitory computer-readable medium described herein, transmitting the signaling may include operations, features, means, or instructions for transmitting the signaling to enable a UHR duplicate data packet mode, the first data frame and the second data frame including UHR PPDUs in accordance with the duplicate data packet mode.

In some examples of the method, apparatuses, and non-transitory computer-readable medium described herein, the UHR PPDUs include a PHY header including one or more identifiers (IDs), the UHR PPDUs support MAC protocol data unit (MPDU) aggregation, and the UHR PPDUs support a first maximum payload size that may be larger than a second maximum payload size supported by non-HT PPDUs.

In some examples of the method, apparatuses, and non-transitory computer-readable medium described herein, transmitting the signaling may include operations, features, means, or instructions for transmitting a management frame or a control frame that enables the duplicate data packet mode.

In some examples of the method, apparatuses, and non-transitory computer-readable medium described herein, transmitting the first data frame may include operations, features, means, or instructions for transmitting, via the first data frame, a first set of multiple A-MSDUs and a first set of multiple check sequences, each check sequence of the first set of multiple check sequences appended to a respective A-MSDU of the first set of multiple A-MSDUs.

In some examples of the method, apparatuses, and non-transitory computer-readable medium described herein, transmitting the first data frame may include operations, features, means, or instructions for transmitting, via the first data frame, a first set of multiple A-MSDU subframes including data and one or more first null A-MSDU subframes interleaved with the first set of multiple A-MSDU subframes.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
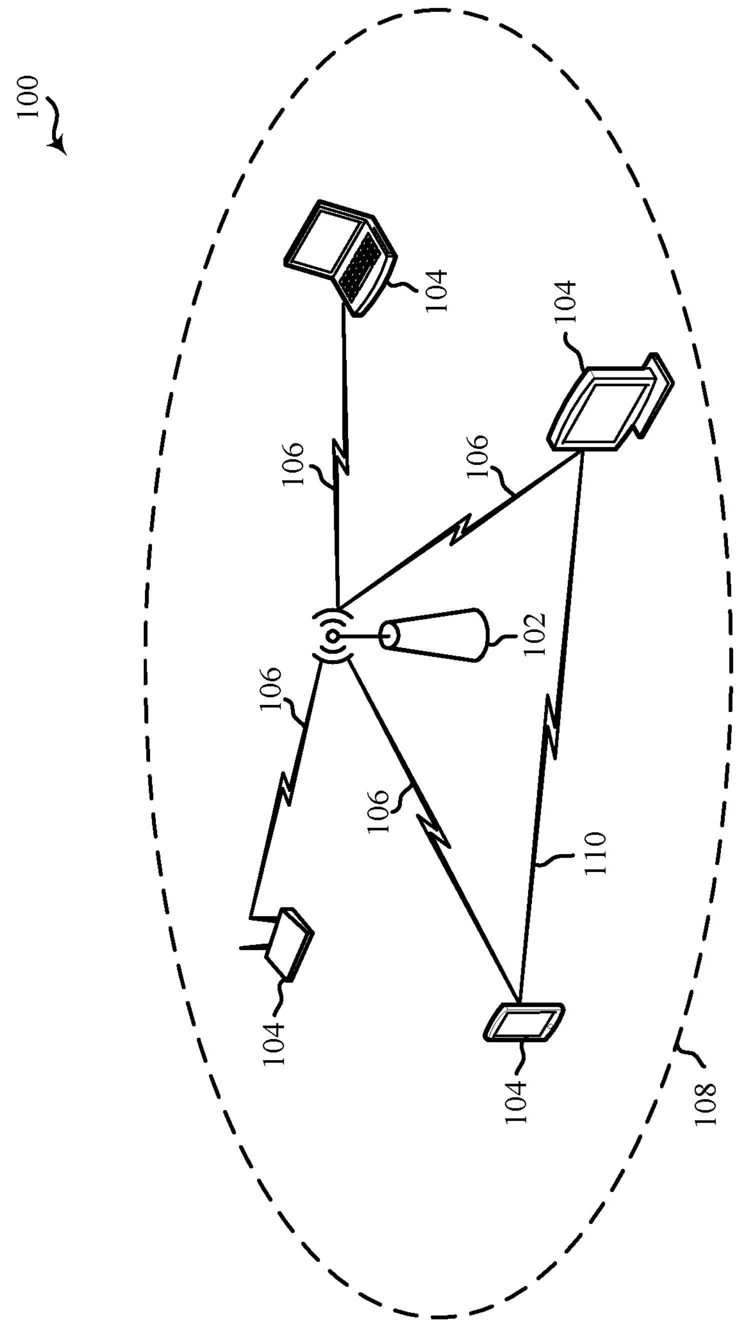
FIG. 1 shows a pictorial diagram of an example wireless communication network that supports packet duplication for data frames in a wireless local area network (WLAN).

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IOT) network.

Various aspects relate generally to wireless communications and more particularly to data packet duplication. Some aspects more specifically relate to supporting duplication of packets that include data frames. In some implementations, a transmitter, such as an access point (AP) or other transmitting device, may transmit two or more physical layer protocol data units (PPDUs) that are duplicates of each other while operating in a duplicate data packet mode. A receiver, such as a station (STA) or other receiving device, may include one or more decoders configured to decode the duplicate PPDUs cumulatively or separately based on a decoding mode. The duplicate data packet mode may be enabled or disabled dynamically based on frames exchanged between the transmitter and receiver. In some implementations, the receiver may maintain one or more auxiliary decoders in a deactivated state until the duplicate data packet mode is enabled to reduce power consumption. The duplicate PPDUs may include an indication, such as for example one or more bits or a field configured to indicate, that the PPDU is a duplicate. The receiver may decode at least one of the duplicate PPDUs and transmit, to the transmitter, a feedback message responsive to at least a portion of one of the duplicate PPDUs.

The PPDU duplication described herein may be applied to PPDUs that include data frames or other types of frames. The duplicate PPDUs may additionally, or alternatively, be non-high throughput (non-HT) PPDUs, ultra-high reliability (UHR) PPDUs, or some other type of PPDU. Different types of PPDUs may be associated with different formats, headers, and supported payload sizes, among other features. For example, an UHR PPDU may include an extended preamble and may convey more data relative to a non-HT PPDU. In some implementations, two or more duplicate PPDUs may each be transmitted via a respective portion, such as a respective frequency range, within a single communication link. In some other examples, duplicate PPDUs may each be sent via a respective communication link. Additionally, or alternatively, two or more transmitting devices may each transmit a respective duplicate PPDU.

Particular aspects of the subject matter described in this disclosure can be implemented to realize one or more of the following potential advantages. In some implementations, by duplicating data packets, the described techniques can be used to transmit two or more data frames that are duplicates of each other in a single transmission, which may increase throughput and reduce retransmission attempts. By utilizing one or more decoders to decode duplicate PPDU transmissions, a receiver may increase a probability that at least one of the duplicate PPDUs is decoded correctly, supporting improved throughput and reliability of communications. In some implementations, the devices may exchange signaling to enable or disable a duplicate data packet mode. The signaling to enable or disable the duplicate data packet mode may provide for the receiver to activate or deactivate auxiliary decoders for reduced processing complexity and power consumption. By supporting duplication of multiple PPDU types, the devices may support various benefits associated with each PPDU type, such as reduced overhead, increased payload size, or the like. In some implementations, duplicate PPDU transmission across multiple communication links or from multiple devices may provide for frequency diversity or spatial diversity, thereby increasing communication reliability.

FIG. 1 shows a pictorial diagram of an example wireless communication network 100 that supports packet duplication for data frames in a WLAN. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ay, 802.11ax, 802.11az, 802.11ba, 802.11bd, 802.11be, 802.11bf, and the 802.11 amendment associated with Wi-Fi 8). The WLAN 100 may include numerous wireless communication devices such as a wireless AP 102 and multiple wireless STAs1. While only one AP 102 is shown in FIG. 1, the WLAN network 100 also can include multiple APs 102. AP 102 shown in FIG. 1 can represent various different types of APs including but not limited to enterprise-level APs, single-frequency APs, dual-b and APs, standalone APs, software-enabled APs (soft APs), and multi-link APs. The coverage area and capacity of a cellular network (such as LTE, 5G NR, etc.) can be further improved by a small cell which is supported by an AP 102 serving as a miniature base station. Furthermore, private cellular networks also can be set up through a wireless area network using small cells.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, chromebooks, extended reality (XR) headsets, wearable devices, display devices (such as TVs (including smart TVs), computer monitors, navigation systems, among others), music or other audio or stereo devices, remote control devices ("remotes"), printers, kitchen appliances (including smart refrigerators) or other household appliances, key fobs (such as for passive keyless entry and start (PKES) systems), Internet of Things (IoT) devices, and vehicles, among other examples. The various STAs 104 in the network are able to communicate with one another via the AP 102.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified or indicated to users by a service set identifier (SSID), as well as to other devices by a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (such as the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA 104 or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some implementations, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some implementations, ad hoc networks may be implemented within a larger wireless network such as the WLAN 100. In such examples, while the STAs 104 may be capable of communicating with each other through the AP 102 using communication links 106, STAs 104 also can communicate directly with each other via direct wireless communication links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to one or more of the IEEE 802.11 family of wireless communication protocol standards. These standards define the WLAN radio and baseband protocols for the PHY and MAC layers. The APs 102 and STAs 104 transmit and receive wireless communications (hereinafter also referred to as "Wi-Fi communications" or "wireless packets") to and from one another in the form of PHY protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some examples of the APs 102 and STAs 104 described herein also may communicate in other frequency bands, such as the 5.9 GHz and the 6 GHz bands, which may support both licensed and unlicensed communications. The APs 102 and STAs 104 also can communicate over other frequency bands such as shared licensed frequency bands, where multiple operators may have a license to operate in the same or overlapping frequency band or bands.

Each of the frequency bands may include multiple subbands or frequency channels. For example, PPDUs conforming to the IEEE 802.11n, 802.11ac, 802.11ax and 802.11be standard amendments may be transmitted over the 2.4 GHz, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 protocol to be used to transmit the payload.

Some APs 102 and STAs 104 may implement techniques for spatial reuse that involve participation in a coordinated communication scheme. According to such techniques, an AP 102 may contend for access to a wireless medium to obtain control of the medium for a TXOP. The AP 102 that wins the contention (hereinafter also referred to as a "sharing AP") may select one or more other APs 102 (hereinafter also referred to as "shared APs") to share resources of the TXOP. The sharing and shared APs 102 may be located in proximity to one another such that at least some of their wireless coverage areas at least partially overlap. Some examples may specifically involve coordinated AP TDMA or OFDMA techniques for sharing the time or frequency resources of a TXOP. To share its time or frequency resources, the sharing AP 102 may partition the TXOP into multiple time segments or frequency segments each including respective time or frequency resources representing a portion of the TXOP, The sharing AP 102 may allocate the time or frequency segments to itself or to one or more of the shared APs 102. For example, each shared AP 102 may utilize a partial TXOP assigned by the sharing AP 102 for its uplink or downlink communications with its associated STAs 104.

In some examples of such TDMA techniques, each portion of a plurality of portions of the TXOP includes a set of time resources that do not overlap with any time resources of any other portion of the plurality of portions. In such examples, the scheduling information may include an indication of time resources, of multiple time resources of the TXOP, associated with each portion of the TXOP. For example, the scheduling information may include an indication of a time segment of the TXOP such as an indication of one or more slots or sets of symbol periods associated with each portion of the TXOP such as for multi-user TDMA.

In some other examples of OFDMA techniques, each portion of the plurality of portions of the TXOP includes a set of frequency resources that do not overlap with any frequency resources of any other portion of the plurality of portions. In such implementations, the scheduling information may include an indication of frequency resources, of multiple frequency resources of the TXOP, associated with each portion of the TXOP. For example, the scheduling information may include an indication of a bandwidth portion of the wireless channel such as an indication of one or more subchannels or resource units (RUs) associated with each portion of the TXOP such as for multi-user OFDMA.

In this manner, the sharing AP's acquisition of the TXOP enables communication between one or more additional shared APs 102 and their respective BSSs, subject to appropriate power control and link adaptation. For example, the sharing AP 102 may limit the transmit powers of the selected shared APs 102 such that interference from the selected APs 102 does not prevent STAs 104 associated with the TXOP owner from successfully decoding packets transmitted by the sharing AP 102. Such techniques may be used to reduce latency because the other APs 102 may not need to wait to win contention for a TXOP to be able to transmit and receive data according to conventional CSMA/CA or EDCA techniques. Additionally, by enabling a group of APs 102 associated with different BSSs to participate in a coordinated AP transmission session, during which the group of APs 102 may share at least a portion of a single TXOP obtained by any one of the participating APs 102, such techniques may increase throughput across the BSSs associated with the participating APs 102 and also may achieve improvements in throughput fairness. Furthermore, with appropriate selection of the shared APs 102 and the scheduling of their respective time or frequency resources, medium utilization may be maximized or otherwise increased while packet loss resulting from OBSS interference is minimized or otherwise reduced. Various implementations may achieve these and other advantages without requiring that the sharing AP 102 or the shared APs 102 be aware of the STAs 104 associated with other BSSs, without requiring a preassigned or dedicated master AP 102 or preassigned groups of APs 102, and without requiring backhaul coordination between the APs 102 participating in the TXOP.

In some examples in which the signal strengths or levels of interference associated with the selected APs 102 are relatively low (such as less than a given value), or when the decoding error rates of the selected APs 102 are relatively low (such as less than a threshold), the start times of the communications among the different BSSs may be synchronous. Conversely, when the signal strengths or levels of interference associated with the selected APs 102 are relatively high (such as greater than the given value), or when the decoding error rates of the selected APs 102 are relatively high (such as greater than the threshold), the start times may be offset from one another by a time period associated with decoding the preamble of a wireless packet and determining, from the decoded preamble, whether the wireless packet is an intra-BSS packet or is an OBSS packet. For example, the time period between the transmission of an intra-BSS packet and the transmission of an OBSS packet may allow a respective AP 102 (or its associated STAs 104) to decode the preamble of the wireless packet and obtain the BSS color value carried in the wireless packet to determine whether the wireless packet is an intra-BSS packet or an OBSS packet. In this manner, each of the participating APs 102 and their associated STAs 104 may be able to receive and decode intra-BSS packets in the presence of OBSS interference.

In some implementations, the sharing AP 102 may perform polling of a set of un-managed or non-co-managed APs 102 that support coordinated reuse to identify candidates for future spatial reuse opportunities. For example, the sharing AP 102 may transmit one or more spatial reuse poll frames as part of determining one or more spatial reuse criteria and selecting one or more other APs 102 to be shared APs 102. According to the polling, the sharing AP 102 may receive responses from one or more of the polled APs 102. In some specific examples, the sharing AP 102 may transmit a coordinated AP TXOP indication (CTI) frame to other APs 102 that indicates time and frequency of resources of the TXOP that can be shared. The sharing AP 102 may select one or more candidate APs 102 upon receiving a coordinated AP TXOP request (CTR) frame from a respective candidate AP 102 that indicates a desire by the respective AP 102 to participate in the TXOP. The poll responses or CTR frames may include a power indication, for example, an RX power or RSSI measured by the respective AP 102. In some other examples, the sharing AP 102 may directly measure potential interference of a service supported (such as UL transmission) at one or more APs 102, and select the shared APs 102 based on the measured potential interference. The sharing AP 102 generally selects the APs 102 to participate in coordinated spatial reuse such that it still protects its own transmissions (which may be referred to as primary transmissions) to and from the STAs 104 in its BSS. The selected APs 102 may then be allocated resources during the TXOP as described above.

Retransmission protocols, such as hybrid automatic repeat request (HARQ), also may offer performance gains. A HARQ protocol may support various HARQ signaling between transmitting and receiving wireless communication devices as well as signaling between the PHY and MAC layers to improve the retransmission operations in a WLAN. HARQ uses a combination of error detection and error correction. For example, a HARQ transmission may include error checking bits that are added to data to be transmitted using an error-detecting (ED) code, such as a cyclic redundancy check (CRC). The error checking bits may be used by the receiving device to determine if it has properly decoded the received HARQ transmission. In some implementations, the original data (information bits) to be transmitted may be encoded with a forward error correction (FEC) code, such as using a low-density parity check (LDPC) coding scheme that systematically encodes the information bits to produce parity bits. The transmitting device may transmit both the original information bits as well as the parity bits in the HARQ transmission to the receiving device. The receiving device may be able to use the parity bits to correct errors in the information bits, thus avoiding a retransmission.

Implementing a HARQ protocol in a WLAN may improve reliability of data communicated from a transmitting device to a receiving device. The HARQ protocol may support the establishment of a HARQ session between the two devices. Once a HARQ session is established, If a receiving device cannot properly decode (and cannot correct the errors) a first HARQ transmission received from the transmitting device, the receiving device may transmit a HARQ feedback message to the transmitting device (such as a negative acknowledgement (NACK)) that indicates at least part of the first HARQ transmission was not properly decoded. Such a HARQ feedback message may be different than the traditional Block ACK feedback message type associated with conventional ARQ. In response to receiving the HARQ feedback message, the transmitting device may transmit a second HARQ transmission to the receiving device to communicate at least part of further assist the receiving device in decoding the first HARQ transmission. For example, the transmitting device may include some or all of the original information bits, some or all of the original parity bits, as well as other, different parity bits in the second HARQ transmission. The combined HARQ transmissions may be processed for decoding and error correction such that the complete signal associated with the HARQ transmissions can be obtained.

In some implementations, the receiving device may be enabled to control whether to continue the HARQ process or revert to a non-HARQ retransmission scheme (such as an ARQ protocol). Such switching may reduce feedback overhead and increase the flexibility for retransmissions by allowing devices to dynamically switch between ARQ and HARQ protocols during frame exchanges. Some implementations also may allow multiplexing of communications that employ ARQ with those that employ HARQ.

The operating bandwidth also may accommodate concurrent operation on other unlicensed frequency bands (such as the 6 GHz band) and a portion of spectrum that includes frequency bands traditionally used by Wi-Fi technology. In noncontiguous examples, the operating bandwidth may span one or more disparate sub-channel sets. For example, the 320 MHz bandwidth may be contiguous and located in the same 6 GHz band or noncontiguous and located in different bands (such as partly in the 5 GHz band and partly in the 6 GHz band).

In some implementations, operability enhancements associated with EHT and newer generations of the IEEE 802.11 family of wireless communication protocols, and in particular operation at an increased bandwidth, may include refinements to carrier sensing and signal reporting mechanisms. Such techniques may include modifications to existing rules, structure, or signaling implemented for legacy systems.

Access to the shared wireless medium is generally governed by a distributed coordination function (DCF). With a DCF, there is generally no centralized master device allocating time and frequency resources of the shared wireless medium. On the contrary, before a wireless communication device, such as an AP 102 or a STA 104, is permitted to transmit data, it may wait for a particular time and then contend for access to the wireless medium. The DCF is implemented through the use of time intervals (including the slot time (or "slot interval") and the inter-frame space (IFS). IFS provides priority access for control frames used for proper network operation. Transmissions may begin at slot boundaries. Different varieties of IFS exist including the short IFS (SIFS), the distributed IFS (DIFS), the extended IFS (EIFS), and the arbitration IFS (AIFS). The values for the slot time and IFS may be provided by a suitable standard specification, such as one or more of the IEEE 802.11 family of wireless communication protocol standards.

In some implementations, the wireless communication device may implement the DCF through the use of carrier sense multiple access (CSMA) with collision avoidance (CA) (CSMA/CA) techniques. According to such techniques, before transmitting data, the wireless communication device may perform a clear channel assessment (CCA) and may determine (such as identify, detect, ascertain, calculate, or compute) that the relevant wireless channel is idle. The CCA includes both physical (PHY-level) carrier sensing and virtual (MAC-level) carrier sensing. Physical carrier sensing is accomplished via a measurement of the received signal strength of a valid frame, which is then compared to a threshold to determine (such as identify, detect, ascertain, calculate, or compute) whether the channel is busy. For example, if the received signal strength of a detected preamble is above a threshold, the medium is considered busy. Physical carrier sensing also includes energy detection. Energy detection involves measuring the total energy the wireless communication device receives regardless of whether the received signal represents a valid frame. If the total energy detected is above a threshold, the medium is considered busy.

Virtual carrier sensing is accomplished via the use of a network allocation vector (NAV), which effectively serves as a time duration that elapses before the wireless communication device may contend for access even in the absence of a detected symbol or even if the detected energy is below the relevant threshold. The NAV is reset each time a valid frame is received that is not addressed to the wireless communication device. When the NAV reaches 0, the wireless communication device performs the physical carrier sensing. If the channel remains idle for the appropriate IFS, the wireless communication device initiates a backoff timer, which represents a duration of time that the device senses the medium to be idle before it is permitted to transmit. If the channel remains idle until the backoff timer expires, the wireless communication device becomes the holder (or "owner") of a transmit opportunity (TXOP) and may begin transmitting. The TXOP is the duration of time the wireless communication device can transmit frames over the channel after it has "won" contention for the wireless medium. The TXOP duration may be indicated in the U-SIG field of a PPDU. If, on the other hand, one or more of the carrier sense mechanisms indicate that the channel is busy, a MAC controller within the wireless communication device will not permit transmission.

In some systems, a wireless communication device may contend for access to the wireless medium using enhanced distributed channel access (EDCA). If the wireless device obtains a TXOP, the wireless device may transmit one or more frames in the TXOP. To improve or maximize throughput, the wireless device may, in some examples, intend to transmit the frames at a highest bandwidth (BW), modulation and coding scheme (MCS), or number of spatial (time) streams (NSS), with the intent of satisfying one or more key performance indicators (KPIs) (such as reliability, latency, or the like) subject to the wireless channel conditions.

In some implementations, the conditions of the wireless channel may change dynamically based on a variety of factors, including noise, interference, distance between two devices, other factors, or any combination thereof. The changing channel conditions may result in a portion or all of a transmission via the channel being lost. As such, the transmitter may retransmit the frames one or multiple times, which may provide for throughput degradation, increased latency due to increased delay, reduced throughput, and reduced reliability. The impacts on delay and throughput may increase as a quantity of retransmissions increases. In some implementations, the transmitter may retransmit the frames until a certain limit or threshold quantity of retransmissions is reached, at which point the transmitter may drop the frames altogether.

Some wireless communication devices (including both APs 102 and STAs 104) are capable of multi-link operation (MLO), which may reduce the impacts of changing channel conditions. In some implementations, MLO supports establishing multiple different communication links (such as a first link on the 2.4 GHz band, a second link on the 5 GHz band, and the third link on the 6 GHz band) between the STA 104 and the AP 102. Each communication link may support one or more sets of channels or logical entities. In some implementations, each communication link associated with a given wireless communication device may be associated with a respective radio of the wireless communication device, which may include one or more transmit/receive (Tx/Rx) chains, include or be coupled with one or more physical antennas, or include signal processing components, among other components. An MLO-capable device may be referred to as a multi-link device (MLD). For example, an AP MLD may include multiple APs 102 each configured to communicate on a respective communication link with a respective one of multiple STAs 104 of a non-AP MLD (also referred to as a "STA MLD"). The STA MLD may communicate with the AP MLD over one or more of the multiple communication links at a given time.

One type of MLO is multi-link aggregation (MLA), where traffic associated with a single STA 104 is simultaneously transmitted across multiple communication links in parallel to maximize the utilization of available resources to achieve higher throughput. That is, during at least some duration of time, transmissions or portions of transmissions may occur over two or more links in parallel at the same time. In some implementations, the parallel wireless communication links may support synchronized transmissions. In some other examples, or during some other durations of time, transmissions over the links may be parallel, but not be synchronized or concurrent. In some examples or durations of time, two or more of the links may be used for communications between the wireless communication devices in the same direction (such as all uplink or all downlink). In some other examples or durations of time, two or more of the links may be used for communications in different directions. For example, one or more links may support uplink communications and one or more links may support downlink communications. In such examples, at least one of the wireless communication devices operates in a full duplex mode. Generally, full duplex operation enables bi-directional communications where at least one of the wireless communication devices may transmit and receive at the same time.

MLA may be implemented in a number of ways. In some implementations, MLA may be packet-based. For packet-based aggregation, frames of a single traffic flow (such as all traffic associated with a given traffic identifier (TID)) may be sent concurrently across multiple communication links. In some other examples, MLA may be flow-based. For flow-based aggregation, each traffic flow (such as all traffic associated with a given TID) may be sent using a single one of multiple available communication links. As an example, a single STA MLD may access a web browser while streaming a video in parallel. The traffic associated with the web browser access may be communicated over a first communication link while the traffic associated with the video stream may be communicated over a second communication link in parallel (such that at least some of the data may be transmitted on the first channel concurrently with data transmitted on the second channel).

In some other examples, MLA may be implemented as a hybrid of flow-based and packet-based aggregation. For example, an MLD may employ flow-based aggregation in situations in which multiple traffic flows are created and may employ packet-based aggregation in other situations. The determination to switch among the MLA techniques or modes may additionally, or alternatively, be associated with other metrics (such as a time of day, traffic load within the network, or battery power for a wireless communication device, among other factors or considerations).

To support MLO techniques, an AP MLD and a STA MLD may exchange supported MLO capability information (such as supported aggregation type or supported frequency bands, among other information). In some implementations, the exchange of information may occur via a beacon signal, a probe request or probe response, an association request or an association response frame, a dedicated action frame, or an operating mode indicator (OMI), among other examples. In some implementations, an AP MLD may designate a given channel in a given band as an anchor channel (such as the channel on which it transmits beacons and other management frames). In such examples, the AP MLD also may transmit beacons (such as ones which may contain less information) on other channels for discovery purposes.

MLO techniques may provide multiple benefits to a WLAN. For example, MLO may improve user perceived throughput (UPT) (such as by quickly flushing per-user transmit queues). Similarly, MLO may improve throughput by improving utilization of available channels and may increase spectral utilization (such as increasing the bandwidth-time product). Further, MLO may enable smooth transitions between multi-band radios (such as where each radio may be associated with a given RF band) or enable a framework to set up separation of control channels and data channels. Other benefits of MLO include reducing the ON time of a modem, which may benefit a wireless communication device in terms of power consumption. Another benefit of MLO is the increased multiplexing opportunities in the case of a single BSS. For example, multi-link aggregation may increase the number of users per multiplexed transmission served by the multi-link AP MLD. MLO may, in some examples, reduce the impact of changing channel conditions. For example, the transmitter may transmit frames over multiple links, and the redundant transmission over multiple links may reduce a likelihood that each of the links experiences a loss at the same time.

MLO may thereby reduce delay and increase throughput for wireless communications. However, the transmissions across the multiple links may occur and be processed independently, such that a wireless device may not benefit from duplicate information sent over multiple links. For example, if one or more portions of a PPDU is erred, the absence of knowledge that this is duplicate information may not be beneficial. Additionally, or alternatively, in some examples, the wireless devices my utilize multiple MAC and PHY layer entities to perform MLO, which may increase complexity and cost.

In some implementations, the wireless communication network 100 may support packet duplication (such as PPDU duplication in Wi-Fi). Such duplication may include non-HT duplicate PPDUs that contain control frames, Beacon frames, and/or Probe Response frames. The duplicate PPDUs may enable control response transmission in wide bandwidths, may expand a range of a BSS in a frequency band, such as the 6 GHz band, and in domains associated with relatively low power spectral density (PSD). Additionally, or alternatively, some EHT or UHR duplicate PPDU may be supported with, for example, duplication of one or more frequency ranges (such as duplication of each 80 MHz portion of a 6 GHz band, or some other portion).

Techniques, systems, and devices described herein provide for wireless devices to support packet duplication in a single communication link or frequency band, across multiple communication links or frequency bands, or across multiple wireless devices (such as APs 102). The described packet duplication techniques may support duplication of PPDUs that contain any type of PPDUs, including non-HT PPDUs that contain data frames. Additionally, or alternatively, some UHR duplicate PPDUs may be defined herein, which may contain any type of frame, such as, for example, data, control, and/or management frames.

Figure 2:
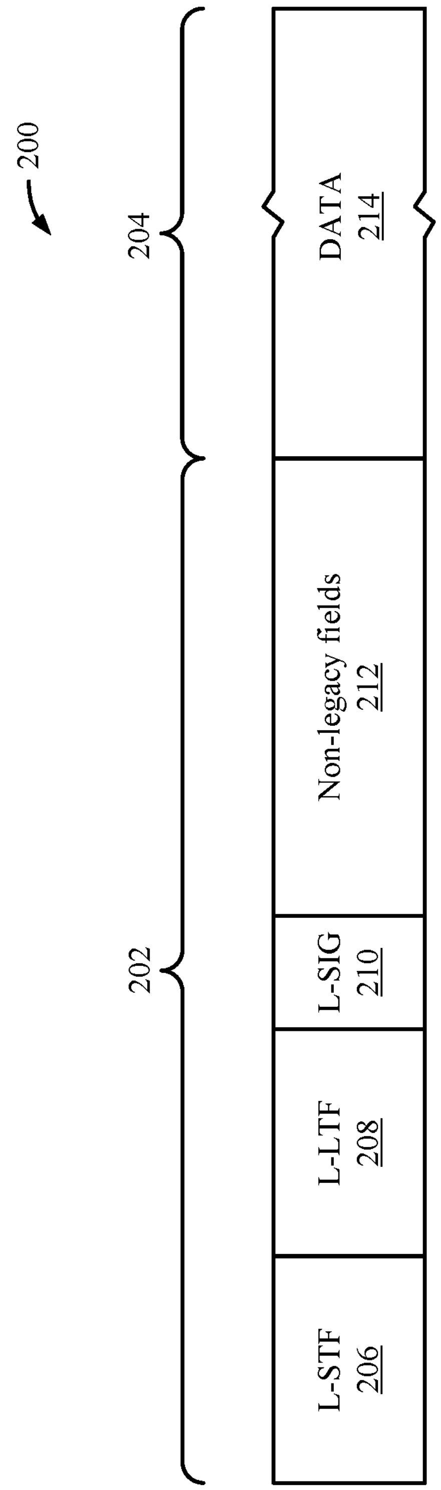
FIG. 2 shows an example physical layer (PHY) protocol data unit (PPDU) usable for communications between a wireless access point and one or more wireless stations that support packet duplication for data frames in a WLAN.

FIG. 2 shows an example PPDU 200 usable for wireless communication between a wireless AP 102 and one or more wireless STAs 104 that support packet duplication for data frames in a WLAN. For example, the PPDU 200 can be configured as a PPDU and/or a protocol data unit (PDU). As shown, the PPDU 200 includes a PHY preamble 202 and a PHY payload 204. For example, the preamble 202 may include a legacy portion that itself includes a legacy short training field (L-STF) 206, which may consist of two symbols, a legacy long training field (L-LTF) 208, which may consist of two symbols, and a legacy signal field (L-SIG) 210, which may consist of two symbols. The legacy portion of the preamble 202 may be configured according to the IEEE 802.11a wireless communication protocol standard. The preamble 202 also may include a non-legacy portion including one or more non-legacy fields 212, for example, conforming to one or more of the IEEE 802.11 family of wireless communication protocol standards.

The L-STF 206 generally enables a receiving device to perform coarse timing and frequency tracking and automatic gain control (AGC). The L-LTF 208 generally enables a receiving device to perform fine timing and frequency tracking and also to perform an initial estimate of the wireless channel. The L-SIG 210 generally enables a receiving device to determine (such as obtain, select, identify, detect, ascertain, calculate, or compute) a duration of the PDU and to use the determined duration to avoid transmitting on top of the PDU. The legacy portion of the preamble, including the L-STF 206, the L-LTF 208 and the L-SIG 210, may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of MAC protocol data units (MPDUs) or an aggregated MPDU (A-MPDU).

Techniques, systems, and devices described herein provide for wireless devices to support duplication of one or more PPDUs in a single communication link or frequency band, across multiple communication links or frequency bands, or across multiple wireless devices (such as APs 102). The described packet duplication techniques may support duplication of any type of PPDUs, including non-HT PPDUs that contain data frames. Additionally, or alternatively, some UHR duplicate PPDUs may be defined herein, which may contain any type of frame, such as, for example, data, control, and/or management frames. Example PPDU formats are described in further detail elsewhere herein, including with reference to FIG. 3.

Figure 3:
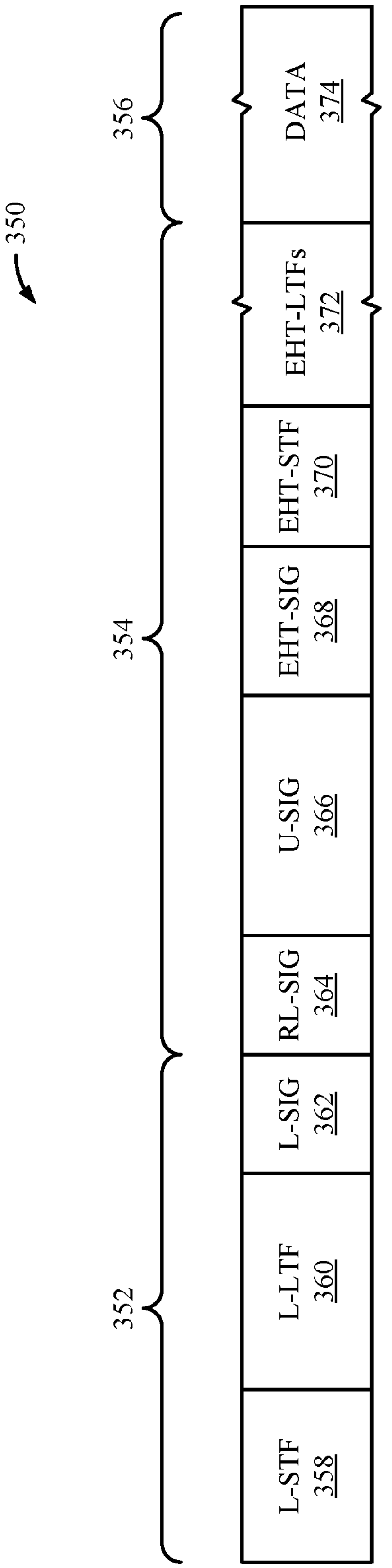
FIG. 3 shows another example PPDU usable for communications between a wireless access point (AP) and one or more wireless stations (STAs) that support packet duplication for data frames in a WLAN.

FIG. 3 shows another example PPDU 350 usable for wireless communication between a wireless AP 102 and one or more wireless STAs 104 that support packet duplication for data frames in a WLAN. The PPDU 350 may be used for SU, OFDMA or MU-MIMO transmissions. The PPDU 350 may be formatted as an Extremely High Throughput (EHT) WLAN PPDU in accordance with the IEEE 802.11be amendment to the IEEE 802.11 family of wireless communication protocol standards, or may be formatted as a PPDU conforming to any later (post-EHT) version of a new wireless communication protocol conforming to a future IEEE 802.11 wireless communication protocol standard, such as the 802.11 amendment associated with Wi-Fi 8), or another wireless communication standard. The PPDU 350 includes a PHY preamble including a legacy portion 352 and a non-legacy portion 354. The PPDU 350 may further include a PHY payload 356 after the preamble, for example, in the form of a PSDU including a data field 374.

The legacy portion 352 of the preamble includes an L-STF 358, an L-LTF 360, and an L-SIG 362. The non-legacy portion 354 of the preamble includes a repetition of L-SIG (RL-SIG) 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. One or both of U-SIG 366 and EHT-SIG 368 may be structured as, and carry version-dependent information for, other wireless communication protocol versions associated with amendments to the IEEE family of standards beyond EHT. For example, U-SIG 366 may be used by a receiving device to interpret bits in one or more of EHT-SIG 368 or the data field 374. Like L-STF 358, L-LTF 360, and L-SIG 362, the information in U-SIG 366 and EHT-SIG 368 may be duplicated and transmitted in each of the component 20 MHz channels in instances involving the use of a bonded channel.

The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). EHT-STF 370 may be used for timing and frequency tracking and AGC, and EHT-LTF 372 may be used for more refined channel estimation.

EHT-SIG 368 may be used by an AP 102 to identify and inform one or multiple STAs 104 that the AP 102 has scheduled UL or DL resources for them. EHT-SIG 368 may be decoded by each compatible STA 104 served by the AP 102. EHT-SIG 368 may generally be used by a receiving device to interpret bits in the data field 374. For example, EHT-SIG 368 may include RU allocation information, spatial stream configuration information, and per-user (such as STA-specific) signaling information. Each EHT-SIG 368 may include a common field and at least one user-specific field. In the context of OFDMA, the common field can indicate RU distributions to multiple STAs 104, indicate the RU assignments in the frequency domain, indicate which RUs are allocated for MU-MIMO transmissions and which RUs correspond to OFDMA transmissions, and the number of users in allocations, among other examples. The user-specific fields are assigned to particular STAs 104 and carry STA-specific scheduling information such as user-specific MCS values and user-specific RU allocation information. Such information enables the respective STAs 104 to identify and decode corresponding RUs in the associated data field 374.

The packet duplication techniques described herein may support duplication of any type PPDUs 350, including non-HT PPDUs that contain data frames. Additionally, or alternatively, some UHR duplicate PPDUs 350 may be defined herein, which may contain any type of frame. The UHR PPDUs 350 may include one or more fields or bits in the PHY preamble to convey an ID of a destination device, an ID of a source device, one or more other IDs, or any combination thereof. Such fields may, in some examples, not be included in a PHY preamble of a non-HT PPDU 350 and may provide support for early PPDU dropping by a STA.

Figure 4:
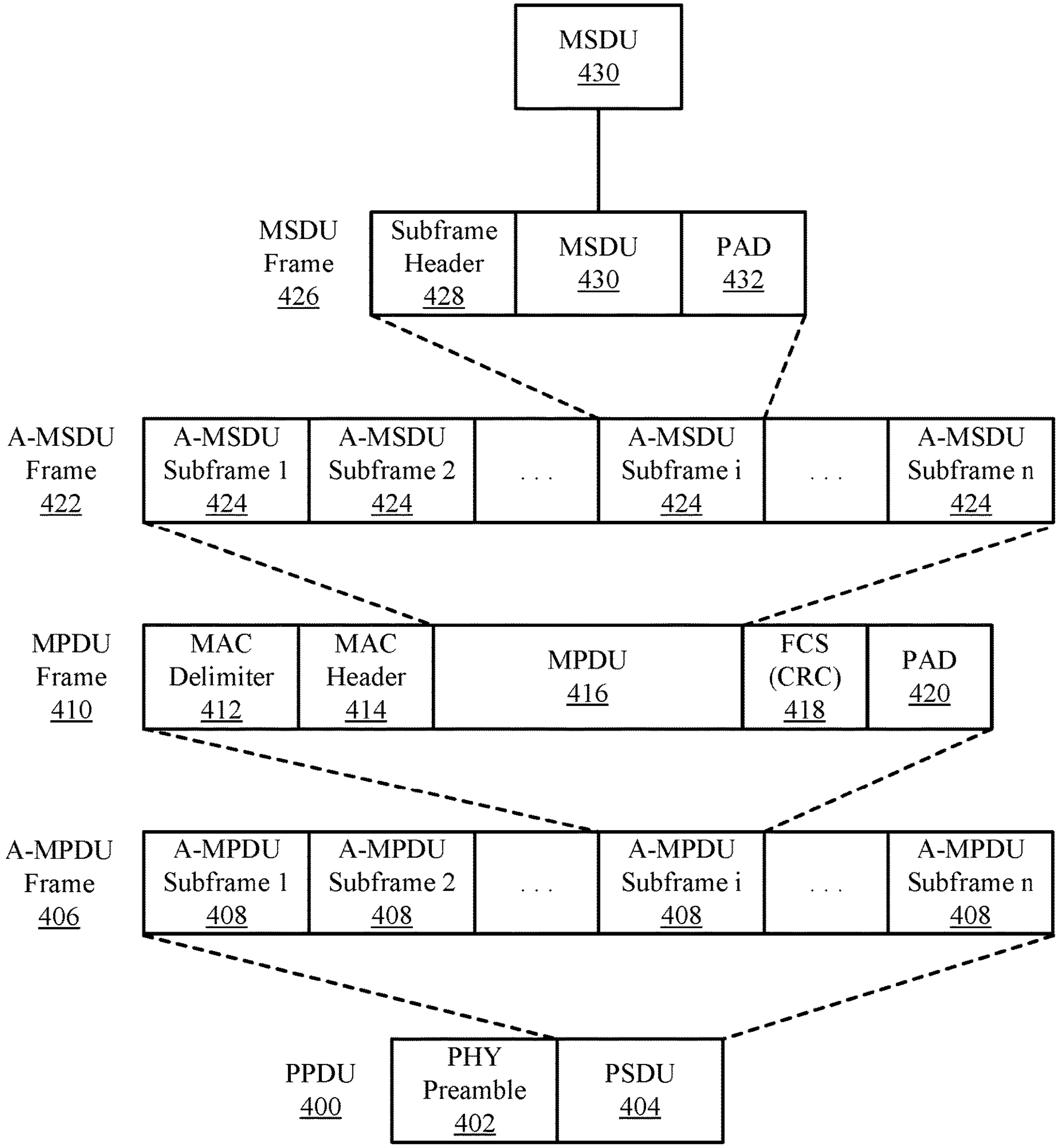
FIG. 4 shows a hierarchical format of an example PPDU usable for communications between a wireless AP and one or more wireless STAs that support packet duplication for data frames in a WLAN.

FIG. 4 shows a hierarchical format of an example PPDU usable for communications between a wireless AP 102 and one or more wireless STAs 104 that supports packet duplication for data frames in a WLAN. As described, each PPDU 400 includes a PHY preamble 402 and a PSDU 404. Each PSDU 404 may represent (or "carry") one or more MAC protocol data units (MPDUs) 416. For example, each PSDU 404 may carry an aggregated MPDU (A-MPDU) 406 that includes an aggregation of multiple A-MPDU subframes 408. Each A-MPDU subframe 406 may include an MPDU frame 410 that includes a MAC delimiter 412 and a MAC header 414 prior to the accompanying MPDU 416, which includes the data portion ("payload" or "frame body") of the MPDU frame 410. Each MPDU frame 410 also may include a frame check sequence (FCS) field 418 for error detection (such as the FCS field may include a cyclic redundancy check (CRC)) and padding bits 420. The MPDU 416 may carry one or more MAC service data units (MSDUs) 416. For example, the MPDU 416 may carry an aggregated MSDU (A-MSDU) 422 including multiple A-MSDU subframes 424. Each A-MSDU subframe 424 may carry one or more MSDU frames 426, which contains a corresponding MSDU 430 preceded by a subframe header 428 and in some cases followed by padding bits 432.

Referring back to the MPDU frame 410, the MAC delimiter 412 may serve as a marker of the start of the associated MPDU 416 and indicate the length of the associated MPDU 416. The MAC header 414 may include multiple fields containing information that defines or indicates characteristics or attributes of data encapsulated within the frame body 416. The MAC header 414 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 414 also includes one or more fields indicating addresses for the data encapsulated within the frame body 416. For example, the MAC header 414 may include a combination of a source address, a transmitter address, a receiver address or a destination address. The MAC header 414 may further include a frame control field containing control information. The frame control field may specify a frame type, for example, a data frame, a control frame, or a management frame.

Techniques, systems, and devices described herein provide for wireless devices to support duplication of one or more PPDUs in a single communication link or frequency band, across multiple communication links or frequency bands, or across multiple wireless devices (such as APs 102). The described packet duplication techniques may support duplication of any type of PPDUs, and may include non-HT PPDUs, that contain data frames. Additionally, or alternatively, some UHR duplicate PPDUs may be defined herein, which may contain any type of frame, such as, for example data, control and/or management frames. In some implementations, a duplicate non-HT PPDU may support aggregation at an MSDU layer. For example, a duplicate non-HT PPDU may include one or more A-MSDU subframes 424. Each A-MSDU subframe 424 may include additional padding or null resources to support such aggregation, as described in further detail elsewhere herein, including with reference to FIG. 7.

Figure 5:
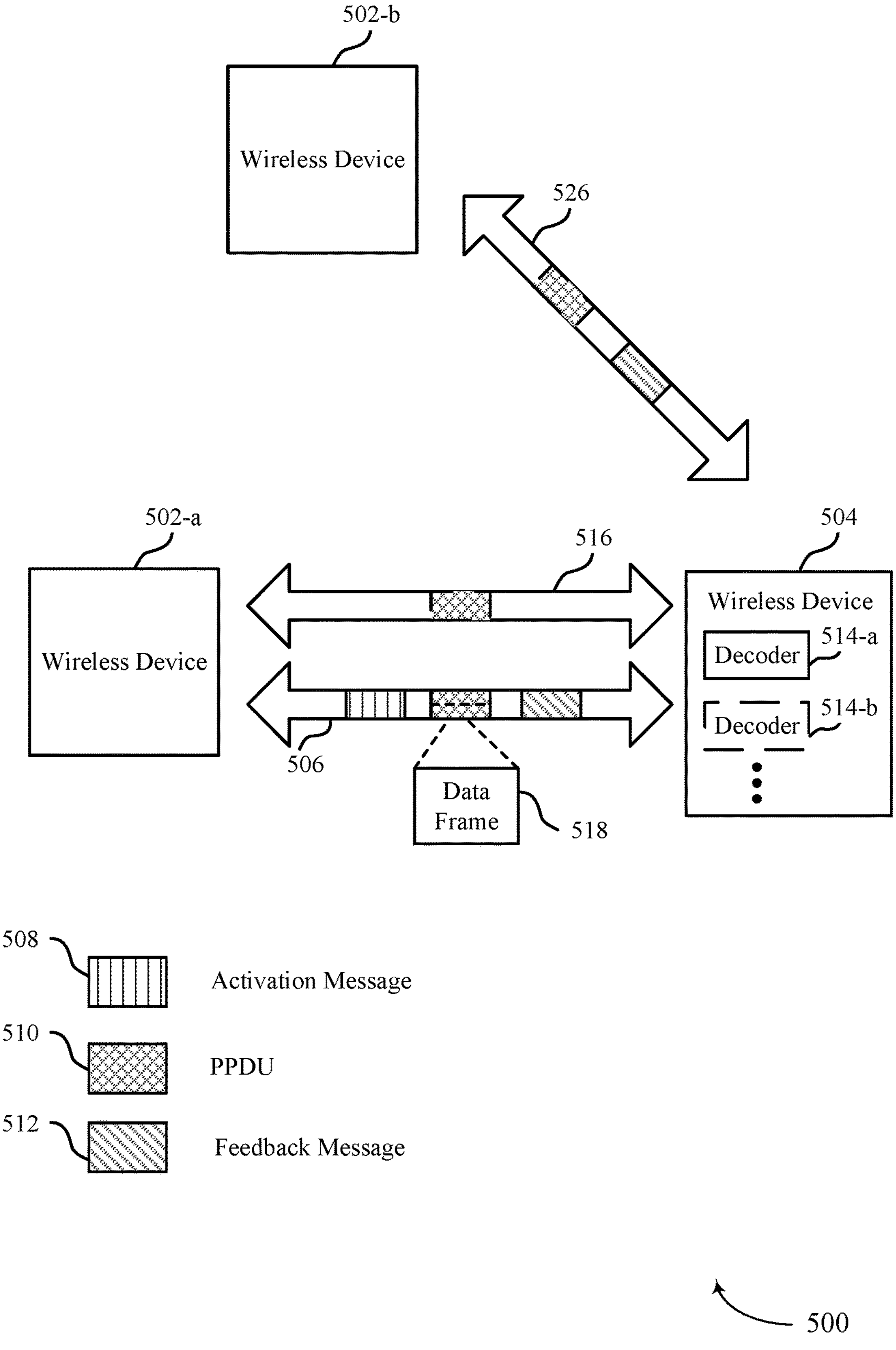
FIG. 5 shows a pictorial diagram of another example wireless communication network that supports packet duplication for data frames in a WLAN.

FIG. 5 shows a pictorial diagram of another example wireless communication network 500 that supports packet duplication for data frames in a WLAN. The wireless communication network 500 may implement or be implemented by one or more aspects of the wireless communication network 100. For example, the wireless communication network 500 may include a first wireless device 504, which may be an example of a STA 104 as described herein, a second wireless device 502-*a*, and a third wireless device 502-*b*, which may be examples of an AP 102 as described herein. The wireless device 504 may communicate with the wireless device 502-*a* via one or more communication links, which may represent examples of a communication link 106 described herein.

In some implementations, the wireless communication network 500 may represent communications between the wireless device 504 and the wireless device 502-*a* on a single wireless link (such as the communication link 506). In some implementations, the wireless device 502-*a* and the wireless device 504 may be MLDs, for example, the wireless device 502-*a* and the wireless device 504 may communicate via multiple wireless links (such as the communication link 506 and the communication link 516). The wireless device 504 may similarly communicate with the wireless device 502-*b* via the communication link 526 or via two or more communication links (not pictured in FIG. 5).

The wireless device 504 and the wireless devices 502-*a* and 502-*b* may function and communicate via the wireless links according to one or more of the IEEE 802.11 family of wireless communication protocol standards. The wireless device 504 and the wireless devices 502-*a* and 502-*b* may transmit and receive wireless communications to and from one another in the form of PPDUs 510 or other packets or transmission frames. The PPDUs 510 may represent examples of the PPDUs described with reference to FIGS. 1-4. In some implementations, the wireless communications may include an activation message 508, a PPDU 510, and a feedback message 512.

In some implementations, the wireless communication network 500 may support PPDU duplication for control frames, beacon frames, or probe response frames. For example, the wireless devices may exchange duplicate control frames to enable a control response transmission in a relatively wide bandwidth or to expand a range of a BSS in a frequency band (such as a 6 GHz band) in some domains in which PSD may be limited. The supported duplication may apply to non-HT PPDUs including control frames, beacon frames, or probe response frames, or to EHT or UHR PPDUs (such as with duplication of each 80 MHz portion in 6 GHz).

Techniques, systems, and devices described herein provide for improved throughput and reliability of communications in the wireless communication network 500 (such as a WLAN system) by supporting duplicate PPDU transmissions for PPDUs 510 containing any type of frame, including data frames 518, while maintaining relatively low complexity, power consumption, and costs. Additionally, or alternatively, some techniques described herein may provide for duplication of other types of PPDUs 510, such as UHR PPDUs.

As described herein, the wireless devices may transmit duplicate PPDUs 510 that include data frames 518. For example, the wireless device 502-*a* may transmit a first PPDU 510 and a second PPDU 510 to the wireless device 504 via the communication link 506. The first and second PPDUs 510 may be transmitted via respective frequency ranges or bands within an operating bandwidth associated with the communication link 506. The first and second PPDUs 510 may each include the data frame 518, and the second PPDU 510 may include a duplicate of the first PPDU 510. That is, the second PPDU 510 may be a replica or a copy of the first PPDU 510, or vice versa. For example, PHY headers and PSDUs within the first and second PPDUs 510 may be replicas of each other, as described in further detail elsewhere herein, including with reference to FIG. 6. The PHY header may contain an indication that the PPDUs are replicas of each other (such as are duplicated). In some implementations, the PSDUs may be duplicated, but the scrambler (contained in the Service field of the Data field of the PSDU) for each of the PSDUs may be different.

The wireless device 504 may be configured with one or more decoders 514 for decoding the duplicate PPDUs 510, such as the decoders 514-*a* and 514-*b* illustrated in FIG. 5. A first decoder 514-*a* may be associated with (such as in or configured to decode) a first or primary channel, such as a primary 20 MHz channel within an operating bandwidth, or some other channel. A second decoder 514-*b* may be associated with (such as in or configured to decode) a second or secondary channel, such as a secondary 20 MHz channel within the operating bandwidth. That is, the first decoder 514-*a* may decode a PHY header and PSDU received via a PPDU 510 in the primary channel and the second decoder 514-*b* may decode a PHY header and PSDU received via a PPDU 510 in the secondary channel. If the wireless device 504 includes more than two decoders 514, the remaining decoders 514 may each be associated with respective channels or frequency ranges and may decode PPDUs 510 received via the respective channels accordingly.

The wireless device 504 may support one or more different decoding modes for decoding duplicate PPDUs 510. In a first decoding mode, the wireless device 504 may activate or include a single decoder 514. The single decoder 514 of the wireless device 504 may be associated with a primary channel and may decode PHY headers and PDSUs of a PPDU 510 received in the primary channel. As described herein, if the wireless device 504 supports the first decoding mode (referred to as a single decoder mode herein) while receiving a duplicate PPDU 510, the wireless device 504 may decide which portion of the PPDU 510 to decode based on one or more parameters or metrics. In some implementations, the wireless device 504 may measure a received signal strength indicator (RSSI) (or some other channel quality metric) associated with each portion of a communication link (such as each 20 MHz channel, or some other portion). The wireless device 504 may select a portion that is associated with a best or highest RSSI measurement to decode. Thus, the wireless device 504 may change an association of the decoder 514 to the selected portion and may decode a PHY header and PDSU of the duplicate PPDU 510 that is received in the selected portion using the decoder 514.

In some other examples, the wireless device (such as an enhanced multi-link single radio (eMLSR) device) may support a second decoding mode (also referred to as an independent decoding mode herein). The independent decoding mode may be associated with independent decoding using one or more decoders 514 of the wireless device 504. For example, the wireless device 504 may configure a main radio or decoder 514, such as the decoder 514-*a*, in a primary channel of an operating bandwidth, and may configure auxiliary radios or decoders 514, such as the decoder 514-*b*, in secondary channels of the operating bandwidth. The radios may independently process the PSDUs included in the duplicate PPDU 510. For example, the decoders 514 may operate independently and may not assist one another with decoding. As such, the wireless device 504 may refrain from performing log-likelihood ratio (LLR) combining, which may use additional processing, and as such may increase complexity and memory consumption. The main radio may transmit and receive signals for the wireless device 504 in this mode, and the auxiliary radios may receive, but may not transmit.

In some other examples, the wireless device 504 may support a third decoding mode (also referred to as a cumulative or combined decoding mode herein). The cumulative decoding mode may be associated with combined decoding using two or more decoders 514. For example, the wireless device 504 (such as an eMLSR device with optimized decoders 514) may perform LLR combining when decoding different portions of the duplicate PPDU 510 using two or more decoders 514. In this mode, the decoder 514-*a* of the wireless device 504 may decode a first duplicate PPDU 510 or portion of the duplicate PPDU 510 and the decoder 514-*b* may decode a second duplicate PPDU 510 or portion of the duplicate PPDU 510. The auxiliary radios at the wireless device 504 may exchange information with a main radio for joint LLR combining. The decoder 514-*b* may exchange information with the decoder 514-*a* to support LLR combining, which may improve decoding reliability and accuracy, in some aspects. The LLR combining may include decoding each symbol at a time and using soft decoding to determine which bits of the PPDU 510 were correct. The decoders 514 may perform multiple tests and combinations until a frame check sequence (FCS) at the end checks or succeeds.

The wireless device 504 may be configured or deployed to operate in accordance with one or more of the decoding modes. For example, the decoders 514 of the wireless device 504 may be operable to support any one of the decoding modes. Additionally, or alternatively, the wireless device 504 may support multiple decoding modes, and may select which decoding mode to operate in at a given time based on one or more communication metrics, based on whether the duplicate PPDU mode is enabled, or both. The cumulative decoding mode may support improved decoding reliability as compared with the independent decoding mode, but may consume more power and/or memory as compared to the independent decoding mode. Thus, there may be tradeoffs between the decoding modes. In some implementations the wireless device may indicate, to a peer wireless device, which decoding mode is being used.

The wireless device 504 may transmit a feedback message 512 responsive to at least a portion of one or more of the duplicate PPDUs 510. The feedback message 512 may indicate whether the wireless device 504 successfully decoded the duplicate PPDU 510. Successful decoding may be different depending on the decoding mode. For example, for the single decoder mode, the decoding may be considered successful if the decoder 514 of the wireless device 504 successfully decodes the selected portion of the duplicate PPDU 510.

In the independent decoding mode, reception by the wireless device 504 may be considered successful if any decoder 514 decodes a corresponding portion of the PPDU 510 correctly. For example, if the decoder 514-*a* decodes a duplicate PPDU 510 or a portion of a duplicate PPDU 510 in a primary channel of the communication link 506 incorrectly (such as a failed decoding attempt), but the decoder 514-*b* decodes a duplicate PPDU 510 or a portion of the duplicate PPDU 510 in a secondary channel of the communication link 506 correctly, the wireless device 504 may determine that decoding of the duplicate PPDU 510 is successful based on the successful decoding of at least a portion of the duplicate PPDU 510. The wireless device 504 may transmit a feedback message 512 that indicates a positive ACK accordingly. However, if both decoders 514-*a* and 514-*b* fail to decode the respective portions of the duplicate PPDU 510, the wireless device 504 may determine that the decoding failed and may transmit a NACK via the feedback message 512.

In the cumulative decoding mode, the decoding of a duplicate PPDU 510 may be considered successful if the combined decoding by all decoders 514 is successful. For example, if the decoder 514-*a* fails to decode a portion of a data frame 518 in the PPDU 510, but the decoder 514-*b* successfully decodes that portion of the data frame 518, the decoding may be considered successful, as the decoders 514 may exchange information to decode the entire duplicate PPDU 510.

The feedback message 512 may thereby be responsive to or indicative of a success of decoding any portion of a duplicate PPDU 510. For example, if the wireless device 504 receives three duplicate data frames 518 as part of a duplicate PPDU 510, the wireless device 504 may transmit the feedback message 512 to indicate whether any of the duplicate data frames 518, which may be portions of the duplicate PPDU 510, were decoded successfully. In some implementations, the feedback message 512 may include a block acknowledgement, which may acknowledge one or more PSDUs or data frames 518 within the duplicate PPDUs 510.

Figure 6:
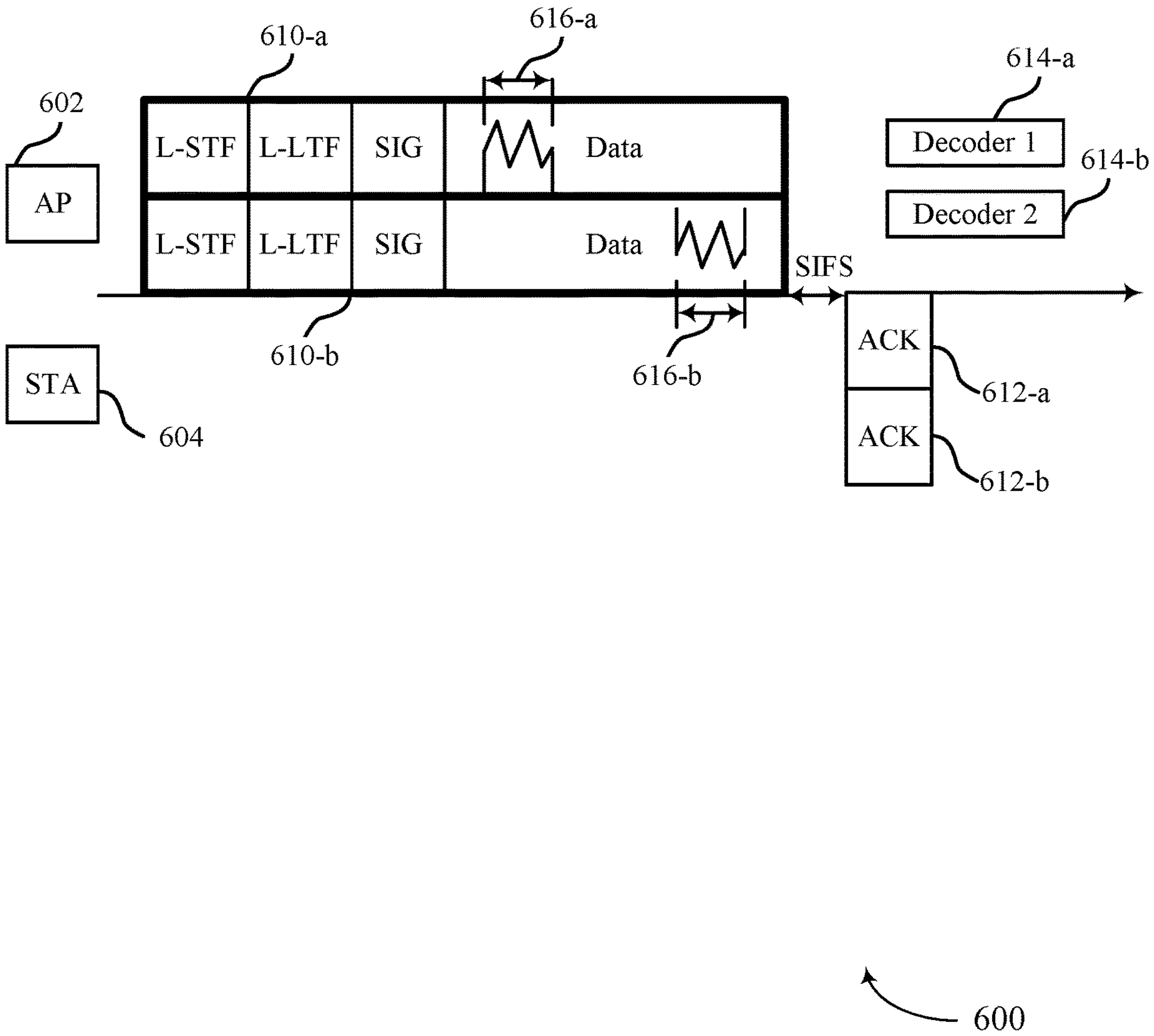
FIG. 6 shows an example duplicate PPDU configuration that supports packet duplication for data frames in a WLAN.

In some implementations, the wireless device 504 may transmit duplicate feedback messages 512, and the wireless devices 502 (such as APs 102) may include one or more decoders for decoding the duplicate feedback messages 512, as described in further detail elsewhere herein, including with reference to FIG. 6.

To reduce power consumption, the wireless device 504 as described herein may dynamically activate and deactivate the decoders 514 on demand. If the wireless device 504 maintains all decoders 514 on or in an active state constantly, the wireless device 504 may consume a relatively large amount of power. Techniques described herein define a duplicate data packet mode (also referred to as a duplicate PPDU mode herein) and signaling for indicating the duplicate data packet mode. The wireless device 504 may reduce power consumption by activating auxiliary decoders 514 when the duplicate data packet mode is enabled and maintaining the auxiliary decoders 514 in an off or deactivated state when the duplicate data packet mode is disabled. Additionally, or alternatively the auxiliary decoders may be used for other purposes when in the deactivated state (such as, discovery, scanning or allocated for wireless communications using other technologies, for example Bluetooth, etc.)

The signaling for dynamically enabling and disabling the duplicate data packet mode may include one or more activation messages 508, which may include management frames, control frames, frames within a TXOP for the wireless device 504, or may be included in the PPDUs 510. The wireless devices 502 and 504 may exchange the one or more activation messages 508 as part of a negotiation procedure, a request, or a notification of the duplicate data packet mode. The duplicate data packet mode may be enabled at the request of the wireless device 504, which may be a receiver, at the request of the wireless device 502-*a* or the wireless device 502-*b*, which may be transmitters, based on a negotiation between the transmitter and receiver, or any combination thereof.

The wireless devices 502-*a* or 502-*b* may request the wireless device 504 to enable the duplicate data mode and corresponding decoders 514 before subsequently transmitting duplicate PPDUs 510. In some implementations, if a wireless device 502 has relatively high priority data to transmit, the device may enable the duplicate data packet mode to improve throughput and reliability. Such traffic may include, for example, low latency or high reliability traffic. Other types of traffic, such as best effort traffic, may be transmitted without packet duplication.

In some implementations, if the wireless device 502-*a* or 502-*b* requests the wireless device 504 to enable the duplicate data packet mode, but the wireless device 504 is unable to operate in the duplicate data packet mode, the devices may perform a negotiation to determine whether to enable or disable the duplicate data packet mode. For example, the wireless device 504 may transmit a responsive message (such as a management frame, control frame, or frame within a TXOP) to request a delay in enabling the duplicate data packet mode or to reject the request to enable the duplicate data packet mode. The wireless device 504 may be unable to operate in the duplicate data packet mode if, for example, one or more auxiliary decoders 514 at the wireless device 504 are unavailable.

In some implementations, the duplicate data packet mode may be enabled or disabled via signaling exchanged at a management level. For example, the wireless device 502-*a* and the wireless device 504 may exchange one or more activation messages 508 including management frames to enable or disable the duplicate data packet mode. The use of management frames to enable or disable the duplicate data packet mode may be similar to the enhanced multi-link operating mode notification frame exchanges for MLO.

In some other examples, the duplicate data packet mode may be enabled or disabled via signaling exchanged at a control level (such as via A-control). For example, the devices may use signaling within a MAC header of one or more data or control frames to perform the enablement or disablement, such as an aggregated control field in the MAC header. The signaling at the control level may be done using hardware and may be relatively fast as compared with the management level (such as on the order of milliseconds, within a TXOP, after an end of a TXOP, or the like). The use of control layer signaling to enable or disable the duplicate data packet mode may be similar to AP assistance requested (AAR) control exchanges for MLO. For example, the control layer signaling may be used to dynamically enable or disable the duplicate data packet mode for one or more communication links.

In some other examples, the duplicate data packet mode may be enabled or disabled via signaling that precedes a TXOP for the duplicate PPDUs 510. A frame exchange via a main radio of the wireless device 504 may precede a TXOP allocated for subsequent exchanges. For example, if the wireless device 502-*a* is going to transmit one or more duplicate PPDUs 510 via a TXOP, the wireless device 502-*a* may transmit a frame that precedes the TXOP to enable the duplicate data packet mode. In some implementations, if a TXOP is not preceded with such a frame exchange, the wireless device 504 may refrain from enabling the duplicate data packet mode. In some implementations, the frame may indicate information about a type of the duplicate data packet mode, such as whether the PPDUs 510 are non-HT PPDUs or UHR PPDUs, or some other type of PPDUs 510. The use of frame exchanges preceding a TXOP may be similar to MU request to send (RTS) trigger, RTS, or clear to send (CTS) frame exchanges that precedes eMLSR transmissions. For example, a transmitter, such as the wireless device 502-*a*, may transmit an RTS that includes one or more bits indicative of enabling the duplicate data packet mode, and a receiver, such as the wireless device 504, may respond with a CTS that permits or rejects the request to enable the duplicate data packet mode. The devices may utilize the described frame exchanges to dynamically switch the duplicate data mode on and off between TXOPs depending on a type and priority of data traffic to be exchanged via each TXOP.

In some other examples, the duplicate data packet mode may be enabled or disabled via signaling within the duplicate PPDU 510. An early indication in a PHY header of the PPDU 510 may indicate that the PPDU 510 is a duplicate PPDU 510. For example, the L-SIG field length may be set to a certain value to indicate the duplicate data packet mode or any reserved bit in the PHY header may be set to an unused value to indicate the duplicate data packet mode. The wireless device 504 may active the auxiliary decoders 514 in response to detecting the early indication in the PHY header, such that the auxiliary decoders are enabled for the duplicate data packet mode in time to receive and decode the data frames. In such cases, the transmitter and receiver may not negotiate whether to enable the mode before transmission of the duplicate PPDU 510.

The PPDU duplication described herein may be applied to duplicate PPDUs 510 that are transmitted in a same operating bandwidth with a potential preamble puncturing, or to duplicate PPDUs 510 that are transmitted across multiple communication links or bands, or to duplicate PPDUs 510 that are transmitted by multiple different devices, or any combination thereof. For example, the wireless device 502-*a* may transmit duplicate PPDUs 510 to the wireless device 504 via the communication link 506, with each PPDU 510 being conveyed via a respective frequency range or channel in the communication link 506.

Additionally, or alternatively, the wireless device 502-*a* may transmit duplicate PPDUs 510 to the wireless device 504 via multiple links. For example, a first duplicate PPDU 510 may be transmitted via at least a portion of frequency resources of the communication link 506 and a second duplicate PPDU 510 may be transmitted via at least a portion of frequency resources within the communication link 516. PPDU duplication across multiple links or bands may improve frequency diversity due to the band separation.

The wireless device 504 may apply the different decoding modes to multi-link PPDU duplication. For example, if the wireless device 504 supports a single decoder 514, the wireless device 504 may select one of the communication links from the multiple communication links over which a duplicate PPDU 510 is conveyed based on RSSI measurements of the links, or some other metric. The wireless device 504 may use the single decoder 514 to decode the duplicate PPDU 510 received on the selected link. If the wireless device supports multiple decoders 514, each decoder may be associated with and may decode a duplicate PPDU 510 received via a respective link. The decoders 514 may perform the decoding of the duplicate PPDUs 510 independently or jointly.

In some other examples, duplicate PPDUs 510 may be transmitted by multiple wireless devices 502 (APs), where each PPDU 510 is transmitted by a separate wireless device 502. For example, the wireless device 502-*a* may transmit a first PPDU 510 to the wireless device 504 via the communication link 506 or the communication link 516, and the wireless device 502-*b* may transmit a second PPDU 510 to the wireless device 504 via the communication link 526, where the second PPDU 510 is a duplicate of the first PPDU 510, or vice versa. Although two wireless devices 502 are illustrated in FIG. 5, it is to be understood that any quantity of wireless devices 502 may transmit duplicate PPDUs 510, where each duplicate PPDU 510 may be sent by a respective wireless device 502. PPDU duplication across multiple devices may improve spatial diversity due to spatial separation between the PPDUs 510.

The wireless device 504 may apply the different decoding modes to multi-device PPDU duplication. For example, if the wireless device 504 supports a single decoder 514, the wireless device 504 may select one of the devices 502 and corresponding links from among the multiple devices 502 that transmit duplicate PPDUs 510 based on RSSI measurements of the links, or some other metric. The wireless device 504 may use the single decoder 514 to decode the duplicate PPDU 510 received from the selected device 502. If the wireless device supports multiple decoders 514, each decoder may be associated with and may decode a duplicate PPDU 510 received from a respective wireless device 502. The decoders 514 may perform the decoding of the duplicate PPDUs 510 independently or jointly. The multi-device duplicate PPDU transmissions may improve reliability in scenarios in which the wireless device 504 communicates with multiple other devices that are not co-located (such as multiple APs placed in different locations). If such non-co-located devices transmit PPDUs 510 in a duplicate mode, the wireless device 504 may be able to receive the duplicate PPDU 510 as long as at least one of the other devices is within range of the wireless device 504.

PPDUs 510 that are duplicates of each other and are transmitted via different links or by different devices may be identified as part of a same duplicate PPDU based on one or more bits or a field in the PPDUs 510. For example, a duration indicated via a signal field (such as the L-SIG field) may be the same in each of the duplicate PPDUs 510. The wireless device 504 (a receiver) may determine that a first PPDU 510 received via the communication link 506 is part of a same duplicate PPDU 510 as a second PPDU 510 received via the communication link 516 or the communication link 526 from the wireless device 502-*b* based on L-SIG fields in both the first and second PPDUs 510 indicating a same duration. In some implementations, the wireless device 504 may monitor for duplicate PPDUs 510 across multiple links or from multiple devices based on the wireless device 504 being in a duplicate data packet mode.

The wireless communication network 500 may thereby support duplicate PPDUs 510 including data frames. The duplication of PPDUs 510 including data frames may support improved throughput and reduced latency for data transmissions.

FIG. 6 shows an example of a duplicate PPDU configuration 600 that supports packet duplication for data frames in a WLAN. The duplicate PPDU configuration 600 may implement or be implemented by aspects of the wireless communication networks 100 and 500 or the PPDUs 350 and 400 described with reference to FIGS. 1-5. For example, the duplicate PPDU configuration 600 illustrates duplicate PPDUs 610-*a* and 610-*b* that are transmitted by an AP 602 to a STA 604, which may represent examples of corresponding PPDUs and devices as described with reference to FIGS. 1-5. In this example, the STA 604 may include at least two decoders 614-*a* and 614-*b* for decoding the duplicate PPDUs 610, as described with reference to FIG. 5.

As described with reference to FIGS. 2 and 3, a PPDU 610 may include a PHY preamble and a PHY payload. The PHY preamble may include one or more training fields and signal fields, such as the L-STF, the L-LTF, and the L-SIG, each of which may consist of some quantity of symbols (such as two symbols). In this example, the PPDUs 610-*a* and 610-*b* may represent non-HT PPDUs, which may be a format of PPDUs that is supported and deferred to by wireless devices (such as by any STA 604 that is associated with an 802.11 wireless communication protocol standard). As such, the PHY header of the PPDUs 610-*a* and 610-*b* may be relatively short (such as 20 microseconds, or some other duration). Such PPDUs 610 may be decoded by relatively simple decoders 614. Decoding complexity may be further reduced as data rates are reduced.

The PHY payload may include a PSDU including a data field (DATA) that carries data for the STA 604. As such, the PPDUs 610-*a* and 610-*b* may convey data frames, and may be different than beacon PPDUs or control PPDUs, or other types of PPDUs. The techniques described herein provide for wireless devices to support duplication of PPDUs that convey data frames.

The duplicate PPDU configuration 600 illustrates two duplicate PPDUs 610-*a* and 610-*b*. The duplicate PPDU 610-*a* may be transmitted via a first frequency range or set of frequency resources, and the second duplicate PPDU 610-*b* may be transmitted via a second frequency range or set of frequency resources. In this example, the PPDUs 610-*a* and 610-*b* may be transmitted within a same operating bandwidth (such as a same communication link). Although not illustrated in FIG. 6, it is to be understood that the duplicate PPDUs 610-*a* and 610-*b* may be transmitted via separate communication links or frequency bands with a gap between them for frequency diversity, or may be transmitted by different APs 602, as described with reference to FIG. 5.

As part of the PPDU duplication, the PHY preamble and PHY payload of the PPDU 610-*b* may be the same as (such as a duplicate, copy, or replica of) the PHY preamble and the PHY payload of the PPDU 610-*a*, or vice versa. That is, the PPDUs 610-*a* and 610-*b* may be the same and may include the same information, such that they may be referred to as duplicate PPDUs 610.

The STA 604 may receive the duplicate PPDUs 610 and process the PPDUs 610 during a short interframe space (SIFS), which may represent an amount of time (such as in microseconds) that the STA 604 may occupy to process a received frame. The processing may include decoding the PPDUs 610 using one or more decoders 614 of the STA 604. As described with reference to FIG. 5, the decoders 614 may operate in one or more of a single decoder mode, an independent decoding mode, or a cumulative decoding mode. In the single decoder mode, the STA 604 may not include the decoder 614-*b* or the decoder 614-*b* may be deactivated. The STA 604 may measure an RSSI of the first frequency range associated with the PPDU 610-*a* and an RSSI of the second frequency range associated with the PPDU 610-*b*. The STA 604 may select the frequency range associated with the highest RSSI and may decode the PPDU 610 received via the selected portion using the decoder 614-*a*. In the independent or cumulative decoding modes, the STA 604 may use the decoder 614-*a* to decode the PPDU 610-*a* and may use the decoder 614-*b* to decode the PPDU 610-*b*. The decoders 614 may perform the decoding independently or cooperatively (such as using LLR combining) based on the mode, as described in further detail elsewhere herein, including with reference to FIG. 5.

In some implementations, one or more bits or symbols of a data frame in a PPDU 610 may be corrupt. For example, the portion 616-*a* of data in the PPDU 610-*a* may be corrupt, and the portion 616-*b* of data in the PPDU 610-*b* may be corrupt. Although the PPDUs 610-*a* and 610-*b* are duplicates, different portions 616 (such as different symbols and bits) may be corrupt due to different channel conditions or other environmental factors. If a portion of a data frame is corrupt, the decoding of the data frame may fail. As such, if the STA 604 decodes the duplicate PPDUs 610 using a single decoder 614, the decoding may fail, regardless of which PPDU 610 is selected because both of the PPDUs 610-*a* and 610-*b* include corrupt portions 616.

Thus, increasing a quantity of decoders 614 at the STA 604 may increase a probability of successful decoding. In some systems, the probability of successful decoding of duplicate PPDUs 610 may be proportional to a frequency range over which the duplicate PPDUs 610 are transmitted. For example, if the frequency spectrum increases, the quantity of duplicate PPDUs 610 that may be transmitted increases, which may further increase the likelihood that at least one of the duplicate PPDUs 610 is not corrupt and may be decoded successfully. Additionally, or alternatively, if cumulative decoding is used (such as if the decoders 614 cooperate to perform LLR combining), the decoders 614 may be more likely to successfully decode all bits of the data frame.

The frequency spectrum may enable one or more different modes for duplication, such as a dual mode (such as two duplicates within a 40 MHz spectrum), a triple mode (such as three duplicates within a 60 MHz spectrum), a quadruple mode (such as four duplicates within an 80 MHz spectrum), and the like. The frequency spectrum may be up to 40 MHz in 2G4, up to 160 MHz in 5G, and up to 320, 480, or 640 MHz in 6G, in some examples. As an example, if the spectrum spans 320 MHz, there may be 16 portions or channels, each including 20 MHz and each conveying a respective duplicate PPDU 610. In some implementations, channel separation may be achieved by including preamble puncturing. Each duplication mode may be associated with a respective gain, and, as the quantity of duplications increases, the gains may increase. For example, the dual mode may achieve up to 3 decibels (dB) gain, the triple mode may achieve up to 4.7 dB gain, and the quadruple mode may achieve up to 6 dB gain, in some examples. The gains achieved in each mode may be viewed in terms of range or reliability and latency. For example, if a domain is a regulatory domain with relatively limited PSD for transmissions, the gain may be viewed in terms of range (such as a link budget). The gains in terms of reliability and latency may be achieved in any domain with relatively wide bandwidths. For example, by increasing bandwidth and supporting more duplications, retransmissions may be reduced and frequency diversity may be increased, which may provide gains in reliability and latency. In some implementations, packet duplication may provide for a reduced packet error rate (PER) for a given transmission, or for an increased MCS and reduced packet length while PER is maintained due to over-the-air transmission reduction.

The STA 604 may transmit an ACK 612 in response to successfully decoding the duplicate PPDUs 610. The ACK 612 may indicate a cumulative decoding result for all of the duplicate PPDUs 610. For example, if the STA 604 is able to decode at least one of the duplicate PPDUs 610, the STA may transmit the ACK 612. If the STA 604 does not decode any of the duplicate PPDUs 610 successfully, the STA 604 may transmit a NACK.

The STA 604 may transmit the ACK 612 via a PPDU (such as a non-HT PPDU). In some implementations, the STA 604 may transmit duplicate ACKs 612. The STA 604 may transmit the ACK 612-*a* and the ACK 612-*b*, which may be a duplicate of the ACK 612-*a*. The STA 604 may transmit the duplicate ACKs 612 via multiple portions of an operating bandwidth, via multiple communication links, or to multiple devices. The AP 602 may, in some examples, include one or more decoders to decode the duplicate ACKs 612, which may improve reliability of the ACK transmission. The AP 602 may be more likely to successfully decode the ACK 612 if the AP 602 receives duplicates, as compared with if the AP 602 receives a single ACK 612, which may improve reliability and reduce retransmission attempts by the AP 602.

In some implementations, the PPDUs 610-*a* and 610-*b* may not support PHY-based early PPDU dropping, aggregation of data at an MPDU level, or relatively large payload sizes. For example, if the PPDUs 610-*a* and 610-*b* are non-HT PPDUs, some level of dropping may be supported by filtering incoming MPDUs (such as A1(RA)/A2(TA) filtering), but the PHY preamble may not include sufficient information for the STA 604 to determine whether the PPDU 610 is intended for the STA 604 based on the PHY preamble alone. Thus, the STA 604 may not be able to detect PPDUs 610 that are not intended for the STA 604 and drop such PPDUs 610 early. Additionally, or alternatively, the non-HT PPDU format may not support aggregate of data at an MPDU level, which may reduce throughput and reliability. In some implementations, the non-HT PPDU format may be configured to support A-MSDU aggregation for this purpose, as described in further detail elsewhere herein, including with reference to FIG. 7. In some implementations, the non-HT PPDU format may support relatively small payload sizes, but may not support payload sizes above a threshold, which may reduce throughput. As such, a different type of PPDU may be defined, which may be referred to as an UHR PPDU.

Techniques described herein provide support for duplicating both non-HT PPDUs 610 and UHR PPDUs containing any type of frame, including data frames. A UHR PPDU may include a longer PHY header than the non-HT PPDU 610. For example, the UHR PPDU PHY header may include one or more identifiers, such as an identifier of a transmitter (the AP 602), an identifier of the receiver (the STA 604), an uplink flag, a BSS Color, or any combination thereof. The STA 604 may decode the PHY preamble and use the identifiers to determine whether the PPDU is addressed to the STA 604 or to another device. The STA 604 may thereby drop UHR PPDUs that are not addressed to the STA 604 early (such as after decoding the PHY header), which may reduce complexity and improve latency. The UHR PPDU may additionally, or alternatively, support A-MPDU aggregation, relatively high data rates (such as greater than 54 megabytes per second for 20 MHz channel spacing) and may consecutively carry relatively large payloads, which may provide for further improved reliability and throughput as compared with the non-HT PPDUs 610. For example, a maximum payload size supported by the UHR PPDU may be larger than a maximum payload size supported by the non-HT PPDU 610. However, the UHR PPDUs may include relatively long PHY headers, guard intervals, MAC headers, padding, and A-MPDU headers, among other features, which may increase overhead as compared with the non-HT PPDUs. Thus, there may be a tradeoff between overhead and reliability/throughput when selecting between UHR and non-HT PPDU formats.

Figure 7:
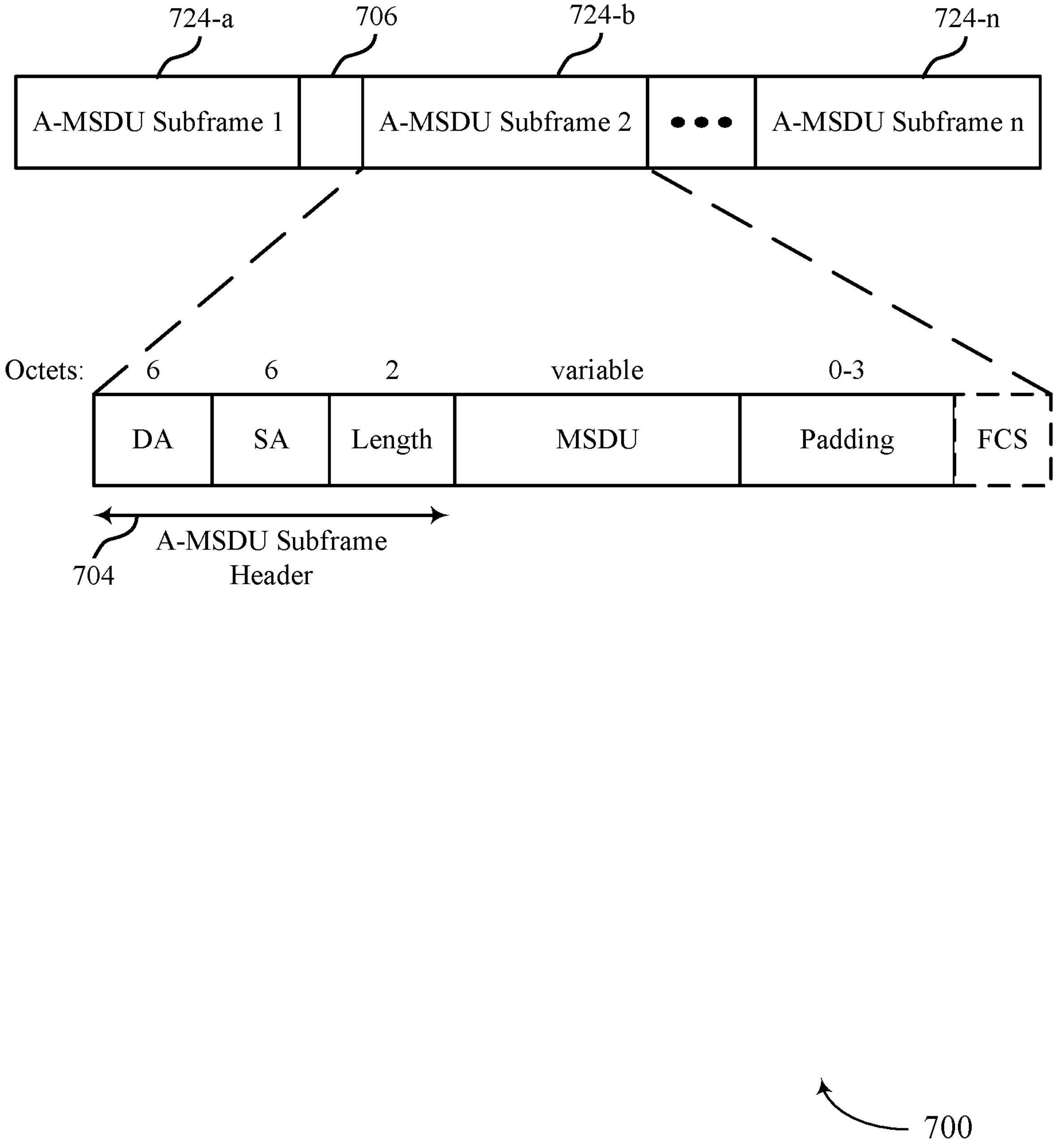
FIG. 7 shows an example of an aggregated medium access control service data unit (A-MSDU) that improves robustness for data frames in a WLAN.

FIG. 7 shows an example of an A-MSDU frame 700 that improves robustness for data frames in a WLAN. The A-MSDU frame 700 may implement or be implemented by aspects of FIGS. 1-6. For example, the A-MSDU frame 700 may represent an example of an A-MSDU frame 422 within an MPDU frame 410 of a PPDU 400, as described with reference to FIG. 4. In this example, the PPDU may be a non-HT PPDU that may not support aggregation at the MPDU level. Techniques described herein provide for an enhanced PPDU format to support inclusion of multiple A-MSDU subframes 724 within a single PPDU, which may provide for increased throughput and reliability associated with duplicate PPDU transmissions.

As described with reference to FIG. 4, the A-MSDU subframes 724-*a*, 724-*b*, and 724-*n* may be aggregated within a frame body of an MPDU, which is carried within a PPDU. Each A-MSDU subframe 724 may include a subframe header 704, which may include a destination address (DA) field and a sender address (SA) field that may act as a signature for the frame. Each subframe header 704 also may include a length field, which may indicate a length (such as a maximum length) of the MSDU, in octets. An A-MSDU subframe 724 may further include an MSDU, which may include a data packet, and padding, which may be one or more null octets to adjust a length of the A-MSDU subframe 724 to be a multiple of four octets.

Aggregation of MSDU subframes within a MPDU may be improved by appending a frame check sequence (FCS) or a message integrity check (MIC) after each A-MSDU subframe 724. The FCS and/or MIC (such as a 32-bit CRC) may support duplication within a same MPDU in time to increase reliability. For example, some devices may not be able to support consecutive parsing of the data packets. The FCS may provide additional time for a receiving device to separate the A-MSDU subframes 724 and corresponding data packets from one another and check the FCS before moving to a subsequent packet. The FCS and/or MIC may be appended to each A-MSDU subframe 724 before the padding or after the padding to protect the content of the MSDU.

Additionally, or alternatively, extra padding may be added by including one or more zero-length A-MSDU subframes 706 in between one or more of the A-MSDU subframes 724 that convey an MSDU. For example, an additional zero-length A-MSDU subframe 706 may be added between the A-MSDU subframe 724-*a* and the A-MSDU subframe 724-*b*. The zero-length A-MSDU subframe 706 may include the DA and SA fields, and may include a length field with a length set to zero. Thus, the zero-length A-MSDU subframe 706 may be some quantity of bytes that may be ignored by a receiver and may provide time for the receiver to process the A-MSDU subframe 724-*a* before processing the A-MSDU subframe 724-*b*. Such padding may be used by auxiliary radios of the receiver to gin more time for processing the MSDU. For example, auxiliary radios that are processing duplicate PPDUs with multiple aggregated MSDUs may utilize the time provided by the zero-length A-MSDU subframe 706 to exchange a receive status of their LLRs, to generate a responsive feedback message, or both.

The described techniques for improving A-MSDU aggregation may provide for a transmitter to transmit multiple MSDUs via a single PPDU, which may be duplicated one or more times as described herein. A receiver, such as a STA, may utilize one or more decoders to decode the multiple MSDUs in each duplicate PPDU independently or cumulatively. The receiver may transmit a feedback message that indicates a result of the decoding.

As described herein, the feedback message may, in some examples, be a block ACK or a block NACK that is responsive to one or more MSDUs within the duplicate PPDUs. For example, the feedback message may include a set of bits to indicate a success or failure of decoding at the MSDU granularity level.

Figure 8:
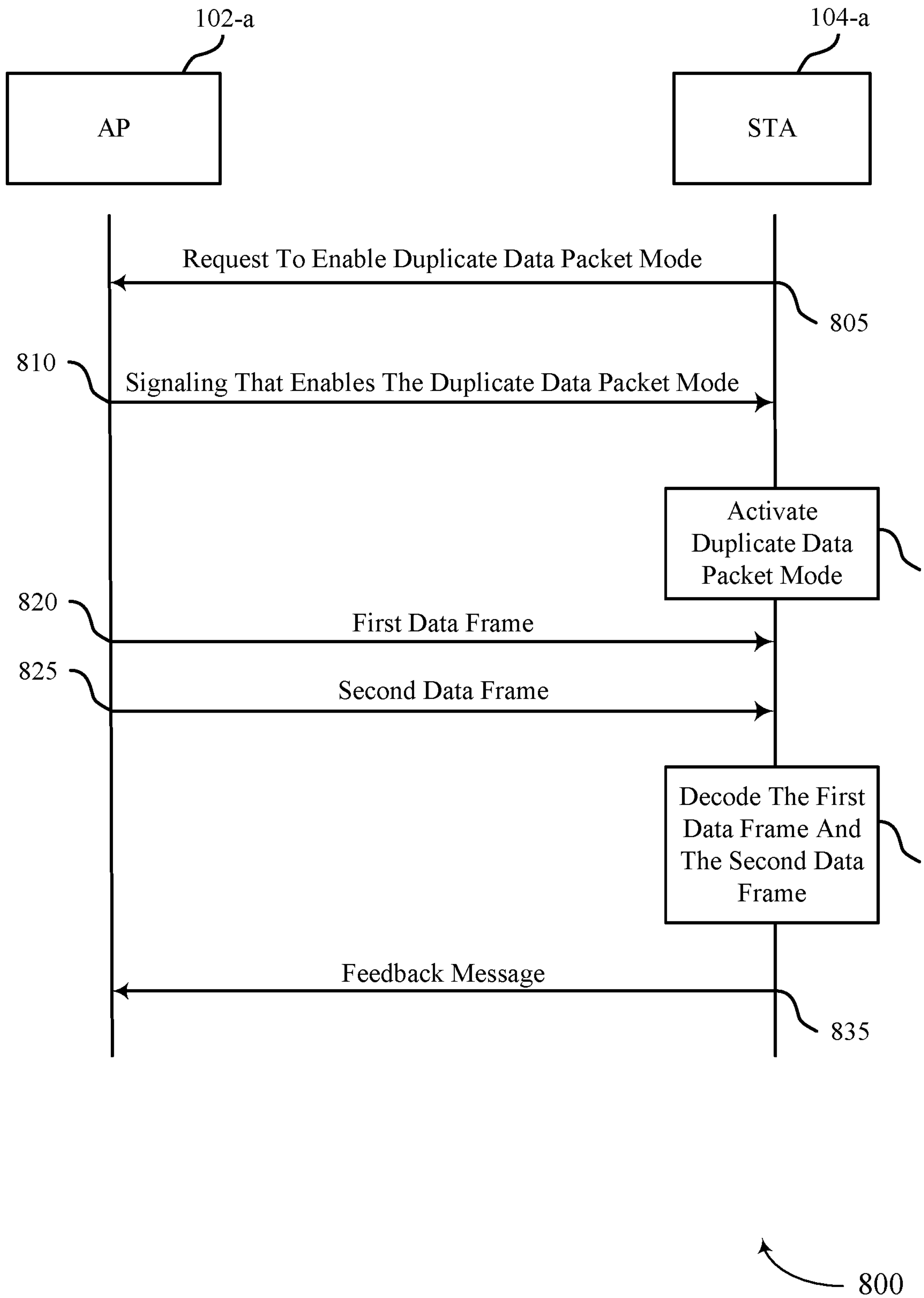
FIG. 8 shows an example of a process flow that supports packet duplication for data frames in a WLAN.

FIG. 8 shows an example of a process flow 800 that supports packet duplication for data frames in a WLAN. The process flow includes an AP 102-*a* and a STA 104-*a*, which may represent examples of APs and STAs as described herein. In the following description of the process flow 800, the operations between the AP 102-*a* and the STA 104-*a* may be transmitted in a different order than the example order shown, or the operations performed by the AP 102-*a* and the STA 104-*a* may be performed in different orders or at different times. Some operations also may be omitted from the process flow 800, and other operations may be added to the process flow 800.

At 805, in some examples, the STA 104-*a* may transmit a request to enable a duplicate data packet mode. At 810, in some examples, the AP 102-*a* may transmit, to the STA 104-*a*, signaling that enables the duplicate data packet mode. The signaling may be based on (such as responsive to) the request. The request to enable the duplicate data packet mode and the signaling may represent an example of a negotiation procedure that may be performed by the AP 102-*a* and the STA 104-*a* to enable the duplicate data packet mode. In some implementations, the AP 102-*a* may transmit the signaling before receiving a request, and the STA 104-*a* may transmit a response that permits or declines the enablement of the duplicate data packet mode. The request and the signaling may be conveyed via one or more types of frames, including control frames, management frames, or other types of frames. In some implementations, the request, the signaling, or both may be conveyed via a header of a duplicate data packet associated with the duplicate data packet mode. Examples of such signaling are described in further detail elsewhere herein, including with reference to FIG. 5.

At 815, the STA 104-*a* may activate the duplicate data packet mode. The STA 104-*a* may activate the duplicate data packet mode based on the signaling, the request, or both. The duplicate data packet mode may be a non-HT duplicate data packet mode or an UHR duplicate data packet mode. In the non-HT duplicate data packet mode, the STA 104-*a* may receive duplicate data frames including non-HT PPDUs. In the UHR duplicate data packet mode, the STA 104-*a* may receive duplicate data frames including UHR PPDUs.

In some aspects, upon activation of the duplicate data packet mode, the STA 104-*a* may activate one or more auxiliary decoders of the STA 104-*a*. For example, prior to activation of the duplicate data packet mode, the STA 104-*a* may use a main decoder for communications and one or more auxiliary decoders of the STA 104-*a* may be disabled. The activation of the duplicate data packet mode may trigger the STA 104-*a* to enable (such as activate) one or more of the auxiliary decoders.

At 820, the AP 102-*a* may transmit a first data frame to the STA 104-*a*. At 825, the AP 102-*a* may transmit a second data frame to the STA 104-*a*. The first and second data frames may be transmitted simultaneously or in at least partially overlapping time periods, in some examples. For example, the first and second data frames may be transmitted via two frequency ranges within an operating bandwidth or within two communication links. In some examples (not pictured in FIG. 8), the AP 102-*a* may transmit the first data frame and a second AP 102 may transmit the second data frame as part of a multi-AP transmission.

The second data frame may be a duplicate of the first data frame, or vice versa, in accordance with the duplicate data packet mode. That is, the first data frame and the second data frame may include a same header and data unit(s). In some implementations, the first and second data frames may be conveyed via respective duplicate PPDUs.

At 830, the STA 104-*a* may decode the first data frame and the second data frame using at least one decoder of the STA 104-*a*. In some implementations, the STA 104-*a* may operate in a single decoder mode, in which case the STA 104-*a* may select one of the first data frame or the second data frame for decoding based on a signal strength of the selected data frame being relatively high. The STA 104-*a* may decode the selected data frame using the single decoder. In some other examples, the STA 104-*a* may operate in an independent or cumulative decoding mode, and the STA 104-*a* may decode the first data frame using a first decoder and the second data frame using a second decoder of the STA 104-*a*. The first and second decoders may decode the data frames independently or cooperatively (such as by exchanging decoding information) based on the decoding mode.

At 835, the STA 104-*a* may transmit a feedback message to the AP 102-*a* based on the decoding. The feedback message may be responsive to at least a portion of the first data frame, the second data frame, or both. For example, if the STA 104-*a* performs cumulative decoding, the feedback message may be responsive to at least a portion of each of the data frames. If the STA 104-*a* performs independent decoding, the feedback message may be responsive to at least one of the data frames. If the STA 104-*a* performs single decoder decoding, the feedback message may be responsive to one of the data frames that the STA 104-*a* decoded. In some implementations, the feedback message may be a block ACK and may include feedback for each data frame of a set of one or more data frames in a PPDU. For example, the feedback message may include a respective ACK or NACK for each A-MSDU in the duplicate PPDUs.

Figure 9:
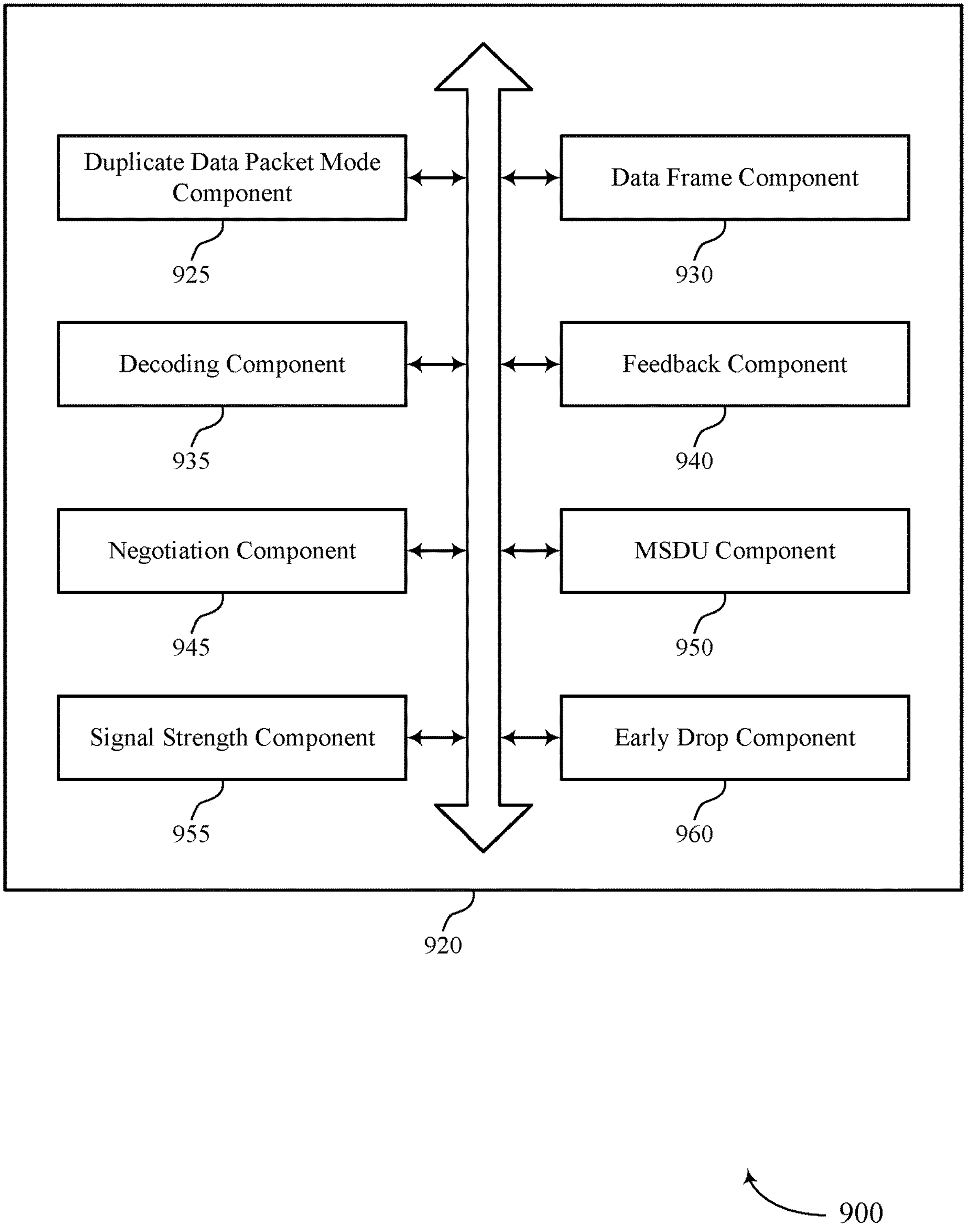
FIG. 9 shows a block diagram of an example wireless communication device that supports packet duplication for data frames in a WLAN.

FIG. 9 shows a block diagram of an example wireless communication device 900 that supports packet duplication for data frames in a WLAN. In various examples, the wireless communication device 900 can be a chip, SoC, chipset, package or device that may include: one or more modems (such as, a Wi-Fi (IEEE 802.11) modem or a cellular modem such as 3GPP 4G LTE or 5G compliant modem); one or more processors, processing blocks or processing elements (collectively "the processor"); one or more radios (collectively "the radio"); and one or more memories or memory blocks (collectively "the memory").

In some implementations, the wireless communication device 900 can be a device for use in a STA, such as STA 104 described with reference to FIG. 1. In some other examples, the wireless communication device 900 can be a STA that includes such a chip, SoC, chipset, package or device as well as multiple antennas. The wireless communication device 900 is capable of transmitting and receiving wireless communications in the form of, for example, wireless packets. For example, the wireless communication device can be configured or operable to transmit and receive packets in the form of physical layer PPDUs and MPDUs conforming to one or more of the IEEE 802.11 family of wireless communication protocol standards. In some implementations, the wireless communication device 900 also includes or can be coupled with an application processor which may be further coupled with another memory. In some implementations, the wireless communication device 900 further includes a user interface (UI) (such as a touchscreen or keypad) and a display, which may be integrated with the UI to form a touchscreen display. In some implementations, the wireless communication device 900 may further include one or more sensors such as, for example, one or more inertial sensors, accelerometers, temperature sensors, pressure sensors, or altitude sensors.

The wireless communication device 900 includes a duplicate data packet mode component 925, a data frame component 930, a decoding component 935, a feedback component 940, a negotiation component 945, an MSDU component 950, a signal strength component 955, and an early drop component 960. Portions of the one or more of the duplicate data packet mode component 925, the data frame component 930, the decoding component 935, the feedback component 940, the negotiation component 945, the MSDU component 950, the signal strength component 955, and the early drop component 960 may be implemented at least in part in the hardware or firmware. For example, one or more of the duplicate data packet mode component 925, the data frame component 930, the decoding component 935, the feedback component 940, the negotiation component 945, the MSDU component 950, the signal strength component 955, and the early drop component 960 may be implemented at least in part by a modem. In some implementations, at least some of the duplicate data packet mode component 925, the data frame component 930, the decoding component 935, the feedback component 940, the negotiation component 945, the MSDU component 950, the signal strength component 955, and the early drop component 960 are implemented at least in part by a processor and as software stored in memory. For example, portions of one or more of the duplicate data packet mode component 925, the data frame component 930, the decoding component 935, the feedback component 940, the negotiation component 945, the MSDU component 950, the signal strength component 955, and the early drop component 960 can be implemented as non-transitory instructions (or "code") executable by the processor to perform the functions or operations of the respective module.

In some implementations, the processor may be a component of a processing system. A processing system may generally refer to a system or series of machines or components that receives inputs and processes the inputs to produce a set of outputs (which may be passed to other systems or components of, for example, the device 900). For example, a processing system of the device 900 may refer to a system including the various other components or subcomponents of the device 900, such as the processor, or a transceiver, or a communications manager, or other components or combinations of components of the device 900. The processing system of the device 900 may interface with other components of the device 900, and may process information received from other components (such as inputs or signals) or output information to other components. For example, a chip or modem of the device 900 may include a processing system, a first interface to output information and a second interface to obtain information. In some implementations, the first interface may refer to an interface between the processing system of the chip or modem and a transmitter, such that the device 900 may transmit information output from the chip or modem. In some implementations, the second interface may refer to an interface between the processing system of the chip or modem and a receiver, such that the device 900 may obtain information or signal inputs, and the information may be passed to the processing system. A person having ordinary skill in the art will readily recognize that the first interface also may obtain information or signal inputs, and the second interface also may output information or signal outputs.

Additionally, or alternatively, the STA 920 may support wireless communication at a STA in accordance with examples as disclosed herein. The duplicate data packet mode component 925 is capable of, configured to, or operable to support a means for activating a duplicate data packet mode. The data frame component 930 is capable of, configured to, or operable to support a means for receiving a first data frame and a second data frame, the second data frame including a duplicate of the first data frame upon activation of a duplicate data packet mode. The decoding component 935 is capable of, configured to, or operable to support a means for decoding, using at least one decoder from among a set of multiple decoders of the STA in accordance with the duplicate data packet mode, the first data frame and the second data frame. The feedback component 940 is capable of, configured to, or operable to support a means for transmitting, associated at least in part with the decoding, a feedback message responsive to at least a portion of the first data frame, the second data frame, or both.

In some implementations, to support activating the duplicate data packet mode, the duplicate data packet mode component 925 is capable of, configured to, or operable to support a means for activating a non-HT duplicate data packet mode, the first data frame and the second data frame including non-high throughput PPDUs in accordance with the non-HT duplicate data packet mode.

In some implementations, to support activating the duplicate data packet mode, the duplicate data packet mode component 925 is capable of, configured to, or operable to support a means for activating an UHR duplicate data packet mode, the first data frame and the second data frame including UHR PPDUs in accordance with the duplicate data packet mode.

In some implementations, the UHR PPDUs include a physical layer header including one or more IDs. In some implementations, the UHR PPDUs support MPDU aggregation. In some implementations, the UHR PPDUs support a first maximum payload size that is larger than a second maximum payload size supported by non-HT PPDUs.

In some implementations, the data frame component 930 is capable of, configured to, or operable to support a means for receiving a third data frame, the third data frame being an UHR PPDU including a physical layer header, the PHY header including an ID of a device. In some implementations, the early drop component 960 is capable of, configured to, or operable to support a means for dropping the third data frame associated at least in part with the PHY header being addressed to the device that is different than the STA.

In some implementations, the negotiation component 945 is capable of, configured to, or operable to support a means for exchanging, in accordance with a duplicate mode negotiation procedure, one or more frames that are configured to enable or disable the duplicate data packet mode, the one or more frames including control frames or management frames. In some implementations, the duplicate data packet mode component 925 is capable of, configured to, or operable to support a means for activating the duplicate data packet mode associated at least in part with the one or more frames.

In some implementations, the duplicate data packet mode component 925 is capable of, configured to, or operable to support a means for receiving, via a physical layer header included in the second data frame, one or more bits that indicate the second data frame is the duplicate of the first data frame in accordance with the duplicate data packet mode.

In some implementations, the decoding component 935 is capable of, configured to, or operable to support a means for activating, upon activation of the duplicate data packet mode at the STA, one or more of the set of multiple decoders of the STA.

In some implementations, to support receiving the first data frame and the second data frame, the MSDU component 950 is capable of, configured to, or operable to support a means for receiving, via the first data frame, a first set of multiple A-MSDUs and a first set of multiple check sequences, each check sequence of the first set of multiple check sequences appended to a respective A-MSDU of the first set of multiple A-MSDUs. In some implementations, to support receiving the first data frame and the second data frame, the MSDU component 950 is capable of, configured to, or operable to support a means for receiving, via the second data frame, a second set of multiple A-MSDUs and a second set of multiple check sequences, each check sequence of the second set of multiple check sequences appended to a respective A-MSDU of the second set of multiple A-MSDUs.

In some implementations, to support receiving the first data frame and the second data frame, the MSDU component 950 is capable of, configured to, or operable to support a means for receiving, via the first data frame, a first set of multiple A-MSDU subframes including data and one or more first null A-MSDU subframes interleaved with the first set of multiple A-MSDU subframes, the decoding of the first data frame performed at least in part during the one or more first null A-MSDU subframes. In some implementations, to support receiving the first data frame and the second data frame, the MSDU component 950 is capable of, configured to, or operable to support a means for receiving, via the second data frame, a second set of multiple A-MSDU subframes including data and one or more second null A-MSDU subframes interleaved with the second set of multiple A-MSDU subframes, the decoding of the second data frame performed at least in part during the one or more second null A-MSDU subframes.

In some implementations, to support receiving the first data frame and the second data frame, the data frame component 930 is capable of, configured to, or operable to support a means for receiving the first data frame via a first frequency range and the second data frame via a second frequency range, the first frequency range and the second frequency range being within an operating bandwidth of the STA.

In some implementations, to support receiving the first data frame and the second data frame, the data frame component 930 is capable of, configured to, or operable to support a means for receiving the first data frame via a first communication link, the first data frame including a first signal field that indicates a duration. In some implementations, to support receiving the first data frame and the second data frame, the data frame component 930 is capable of, configured to, or operable to support a means for receiving the second data frame via a second communication link different than the first communication link, the second data frame including a second signal field that indicates the duration associated at least in part with the second data frame including the duplicate of the first data frame.

In some implementations, to support receiving the first data frame and the second data frame, the data frame component 930 is capable of, configured to, or operable to support a means for receiving the first data frame from a first AP, the first data frame including a first signal field that indicates a duration. In some implementations, to support receiving the first data frame and the second data frame, the data frame component 930 is capable of, configured to, or operable to support a means for receiving the second data frame from a second AP different than the first AP, the second data frame including a second signal field that indicates the duration associated at least in part with the second data frame including the duplicate of the first data frame.

In some implementations, to support decoding the first data frame, the second data frame, or both, the decoding component 935 is capable of, configured to, or operable to support a means for decoding the first data frame using a first decoder of the set of multiple decoders of the STA. In some implementations, to support decoding the first data frame, the second data frame, or both, the decoding component 935 is capable of, configured to, or operable to support a means for decoding the second data frame using a second decoder of the set of multiple decoders of the STA.

In some implementations, to support transmitting the feedback message, the feedback component 940 is capable of, configured to, or operable to support a means for transmitting a positive acknowledgement associated at least in part with at least one of the first data frame or the second data frame being decoded successfully and the second decoder operating independently from the first decoder in accordance with the duplicate data packet mode being an independent decoding mode. In some implementations, to support transmitting the feedback message, the feedback component 940 is capable of, configured to, or operable to support a means for transmitting a negative acknowledgement associated at least in part with a failure to decode either of the first data frame and the second data frame and the second decoder operating independently from the first decoder in accordance with the independent decoding mode.

In some implementations, to support transmitting the feedback message, the feedback component 940 is capable of, configured to, or operable to support a means for transmitting a positive acknowledgement associated at least in part with combined decoding of the first data frame and the second data frame being successful and the second decoder operating cooperatively with the first decoder in accordance with the duplicate data packet mode being a combined decoding mode. In some implementations, to support transmitting the feedback message, the feedback component 940 is capable of, configured to, or operable to support a means for transmitting a negative acknowledgement associated at least in part with the combined decoding of the first data frame and the second data frame failing and the second decoder operating cooperatively with the first decoder in accordance with the combined decoding mode.

In some implementations, the first decoder is associated with decoding data received via a first frequency range and the second decoder is associated with decoding data received via a second frequency range.

In some implementations, the first decoder exchanges information with the second decoder in accordance with the duplicate data packet mode being a combined decoding mode.

In some implementations, to support decoding the first data frame, the second data frame, or both, the signal strength component 955 is capable of, configured to, or operable to support a means for decoding the first data frame associated at least in part with a first signal strength indicator associated with a first frequency range including the first data frame being greater than a second signal strength indicator associated with a second frequency range including the second data frame, the feedback message responsive to the first data frame in accordance with the decoding.

In some implementations, the duplicate data packet mode component 925 is capable of, configured to, or operable to support a means for transmitting a request to enable the duplicate data packet mode. In some implementations, the duplicate data packet mode component 925 is capable of, configured to, or operable to support a means for receiving, associated at least in part with the request, signaling that enables the duplicate data packet mode, activating the duplicate data packet mode being associated at least in part with the signaling.

In some implementations, the feedback component 940 is capable of, configured to, or operable to support a means for transmitting a second feedback message including a duplicate of the feedback message in accordance with the duplicate data packet mode.

Figure 10:
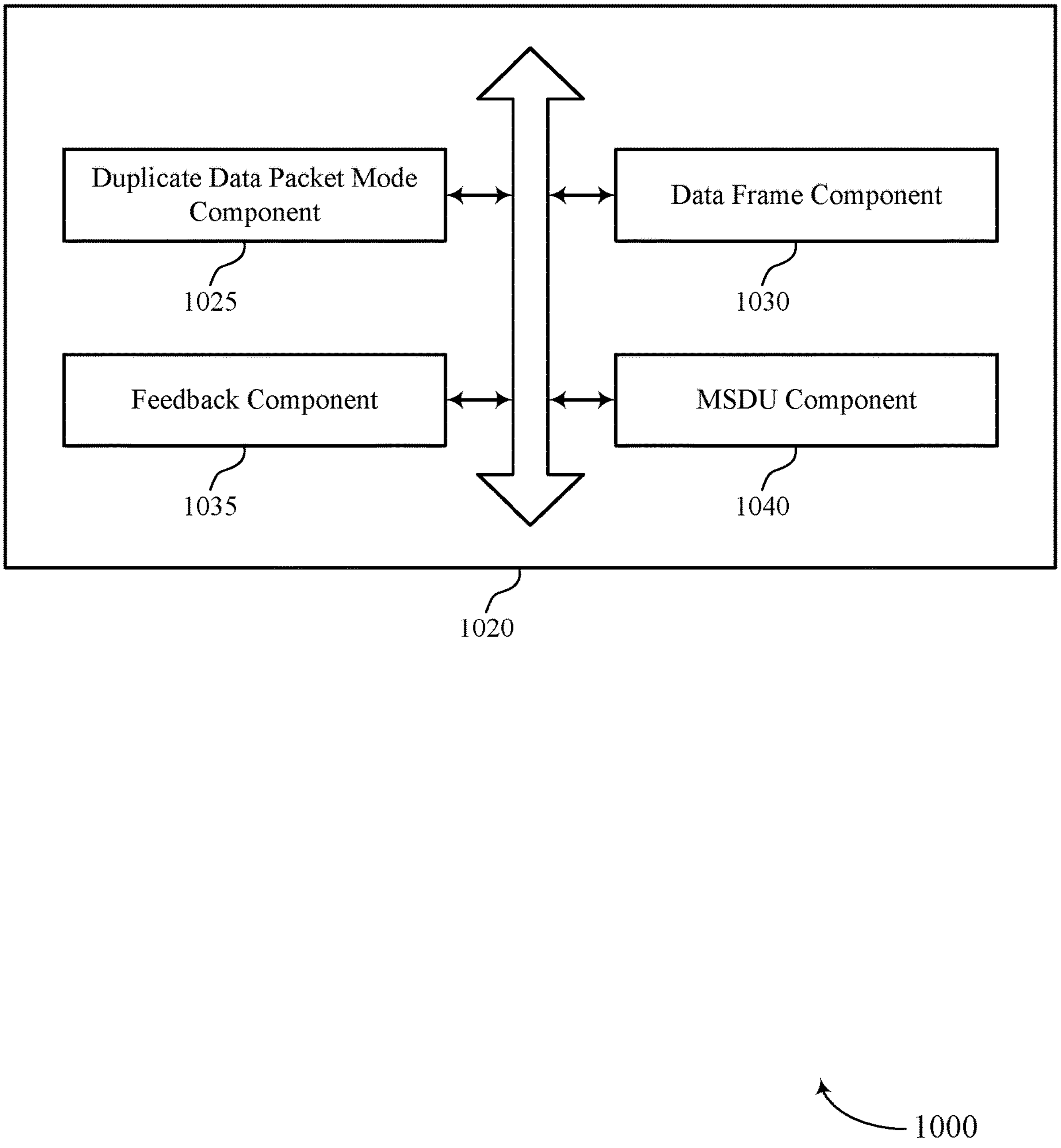
FIG. 10 shows a block diagram of an example wireless communication device that supports packet duplication for data frames in a WLAN.

FIG. 10 shows a block diagram of an example wireless communication device 1000 that supports packet duplication for data frames in a WLAN. In various examples, the wireless communication device 1000 can be a chip, SoC, chipset, package or device that may include: one or more modems (such as, a Wi-Fi (IEEE 802.11) modem or a cellular modem such as 3GPP 4G LTE or 5G compliant modem); one or more processors, processing blocks or processing elements (collectively “the processor”); one or more radios (collectively “the radio”); and one or more memories or memory blocks (collectively “the memory”).

In some implementations, the wireless communication device 1000 can be a device for use in an AP, such as AP 102 described with reference to FIG. 1. In some other examples, the wireless communication device 1000 can be an AP that includes such a chip, SoC, chipset, package or device as well as multiple antennas. The wireless communication device 1000 is capable of transmitting and receiving wireless communications in the form of, for example, wireless packets. For example, the wireless communication device can be configured or operable to transmit and receive packets in the form of physical layer PPDUs and MPDUs conforming to one or more of the IEEE 802.11 family of wireless communication protocol standards. In some implementations, the wireless communication device 1000 also includes or can be coupled with an application processor which may be further coupled with another memory. In some implementations, the wireless communication device 1000 further includes at least one external network interface that enables communication with a core network or backhaul network to gain access to external networks including the Internet.

The wireless communication device 1000 includes a duplicate data packet mode component 1025, a data frame component 1030, a feedback component 1035, and an MSDU component 1040. Portions of the one or more of the duplicate data packet mode component 1025, the data frame component 1030, the feedback component 1035, and the MSDU component 1040 may be implemented at least in part in the hardware or firmware. For example, one or more of the duplicate data packet mode component 1025, the data frame component 1030, the feedback component 1035, and the MSDU component 1040 may be implemented at least in part by a modem. In some implementations, at least some of the duplicate data packet mode component 1025, the data frame component 1030, the feedback component 1035, and the MSDU component 1040 are implemented at least in part by a processor and as software stored in memory. For example, portions of one or more of the duplicate data packet mode component 1025, the data frame component 1030, the feedback component 1035, and the MSDU component 1040 can be implemented as non-transitory instructions (or "code") executable by the processor to perform the functions or operations of the respective module.

In some implementations, the processor may be a component of a processing system. A processing system may generally refer to a system or series of machines or components that receives inputs and processes the inputs to produce a set of outputs (which may be passed to other systems or components of, for example, the device 1000). For example, a processing system of the device 1000 may refer to a system including the various other components or subcomponents of the device 1000, such as the processor, or a transceiver, or a communications manager, or other components or combinations of components of the device 1000. The processing system of the device 1000 may interface with other components of the device 1000, and may process information received from other components (such as inputs or signals) or output information to other components. For example, a chip or modem of the device 1000 may include a processing system, a first interface to output information and a second interface to obtain information. In some implementations, the first interface may refer to an interface between the processing system of the chip or modem and a transmitter, such that the device 1000 may transmit information output from the chip or modem. In some implementations, the second interface may refer to an interface between the processing system of the chip or modem and a receiver, such that the device 1000 may obtain information or signal inputs, and the information may be passed to the processing system. A person having ordinary skill in the art will readily recognize that the first interface also may obtain information or signal inputs, and the second interface also may output information or signal outputs.

Additionally, or alternatively, the AP 1020 may support wireless communication at an AP in accordance with examples as disclosed herein. The duplicate data packet mode component 1025 is capable of, configured to, or operable to support a means for receiving a request to enable a duplicate data packet mode. In some implementations, the duplicate data packet mode component 1025 is capable of, configured to, or operable to support a means for transmitting, associated at least in part with the request, signaling that enables the duplicate data packet mode. The data frame component 1030 is capable of, configured to, or operable to support a means for transmitting at least a first data frame, the first data frame including a duplicate of a second data frame in accordance with the duplicate data packet mode. The feedback component 1035 is capable of, configured to, or operable to support a means for receiving a feedback message responsive to at least a portion of the first data frame, the second data frame, or both.

In some implementations, to support transmitting the signaling, the duplicate data packet mode component 1025 is capable of, configured to, or operable to support a means for transmitting the signaling to enable a non-HT duplicate data packet mode, the first data frame and the second data frame including non-HT PPDUs in accordance with the non-HT duplicate data packet mode.

In some implementations, to support transmitting the signaling, the duplicate data packet mode component 1025 is capable of, configured to, or operable to support a means for transmitting the signaling to enable an UHR duplicate data packet mode, the first data frame and the second data frame including UHR PPDUs in accordance with the duplicate data packet mode.

In some implementations, the UHR PPDUs include a PHY header including one or more IDs. In some implementations, the UHR PPDUs support MPDU aggregation. In some implementations, the UHR PPDUs support a first maximum payload size that is larger than a second maximum payload size supported by non-HT PPDUs.

In some implementations, to support transmitting the signaling, the duplicate data packet mode component 1025 is capable of, configured to, or operable to support a means for transmitting a management frame or a control frame that enables the duplicate data packet mode.

In some implementations, to support transmitting the first data frame, the data frame component 1030 is capable of, configured to, or operable to support a means for transmitting, via a PHY header included in the first data frame, one or more bits that indicate the first data frame is a duplicate data frame associated at least in part with the second data frame being the duplicate of the first data frame and the duplicate data packet mode.

In some implementations, to support transmitting the first data frame, the MSDU component 1040 is capable of, configured to, or operable to support a means for transmitting, via the first data frame, a first set of multiple A-MSDUs and a first set of multiple check sequences, each check sequence of the first set of multiple check sequences appended to a respective A-MSDU of the first set of multiple A-MSDUs.

In some implementations, to support transmitting the first data frame, the MSDU component 1040 is capable of, configured to, or operable to support a means for transmitting, via the first data frame, a first set of multiple A-MSDU subframes including data and one or more first null A-MSDU subframes interleaved with the first set of multiple A-MSDU subframes.

In some implementations, the data frame component 1030 is capable of, configured to, or operable to support a means for transmitting the second data frame via a second frequency range, the first data frame transmitted via a first frequency range, the first frequency range and the second frequency range being within an operating bandwidth of the access point.

In some implementations, the data frame component 1030 is capable of, configured to, or operable to support a means for transmitting the second data frame via a second communication link, the first data frame transmitted via a first communication link different than the second communication link and including a first signal field that indicates a duration, the second data frame including a second signal field that indicates the duration associated at least in part with the second data frame including the duplicate of the first data frame.

In some implementations, the second data frame is associated with a second AP different than the AP.

In some implementations, the feedback component 1035 is capable of, configured to, or operable to support a means for receiving a second feedback message including a duplicate of the feedback message in accordance with the duplicate data packet mode. In some implementations, feedback component 1035 is capable of, configured to, or operable to support a means for decoding the feedback message using a first decoder of the AP. In some implementations, the feedback component 1035 is capable of, configured to, or operable to support a means for decoding the second feedback message using a second decoder of the AP.

Figure 11:
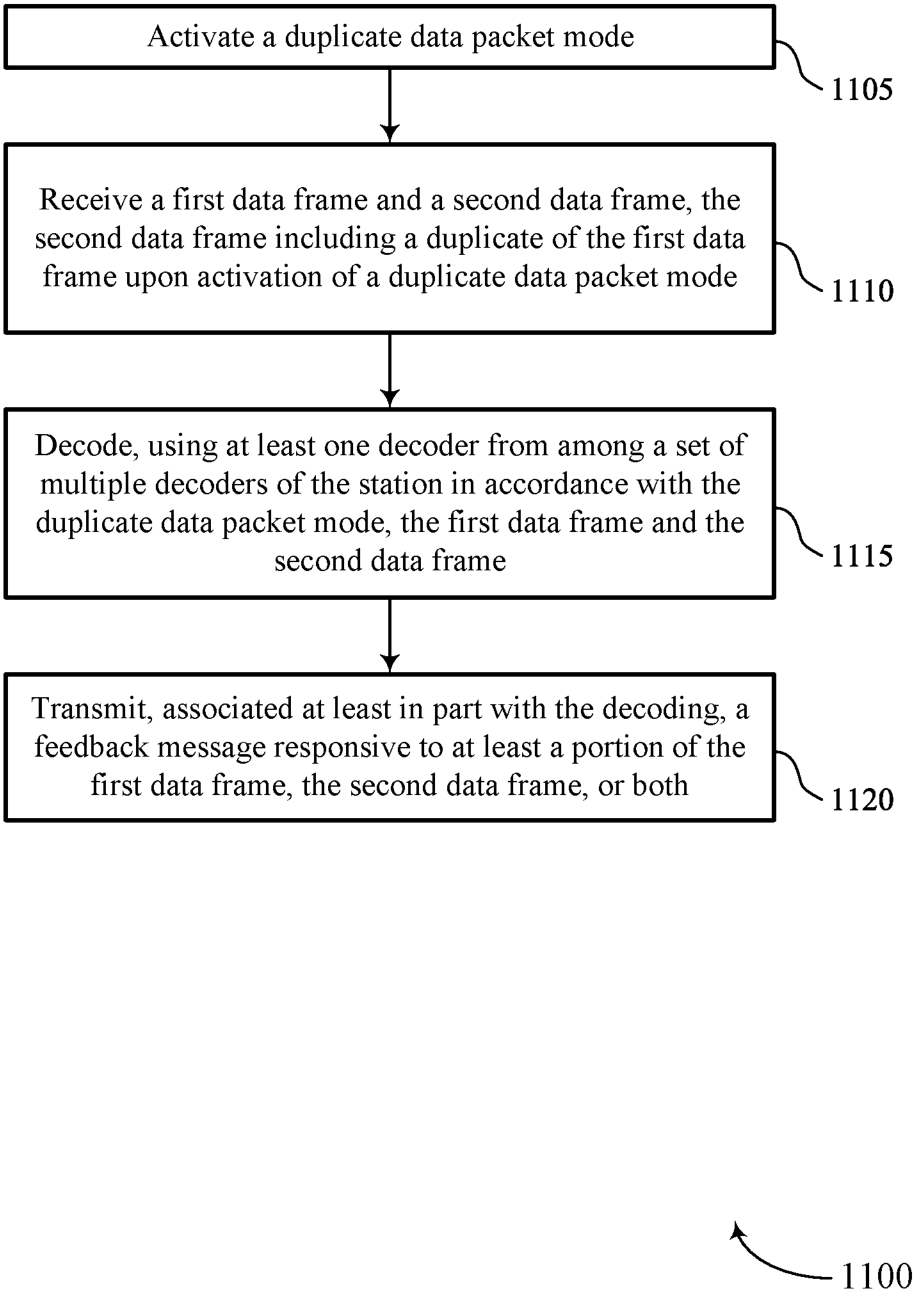
FIGS. 11 and 12 show flowcharts illustrating example processes that support packet duplication for data frames in a WLAN.

FIG. 11 shows a flowchart illustrating an example process 1100 performable at a wireless STA that supports packet duplication for data frames in a WLAN. The operations of the process 1100 may be an example of a method implemented by a wireless STA or its components as described herein. For example, the process 1100 may be performed by a wireless communication device, such as the wireless communication device 900 described with reference to FIG. 9, operating as or within a wireless STA. In some implementations, the process 1100 may be performed by a wireless STA, such as one of the STAs 104 described with reference to FIG. 1.

In some implementations, in block 1105, the wireless STA may activate a duplicate data packet mode. The operations of block 1105 may be performed in accordance with examples as disclosed herein. In some implementations, aspects of the operations of block 1105 may be performed by a duplicate data packet mode component 925 as described with reference to FIG. 9.

In some implementations, in block 1110, the wireless STA may receive a first data frame and a second data frame, the second data frame including a duplicate of the first data frame upon activation of a duplicate data packet mode. The operations of block 1110 may be performed in accordance with examples as disclosed herein. In some implementations, aspects of the operations of block 1110 may be performed by a data frame component 930 as described with reference to FIG. 9.

In some implementations, in block 1115, the wireless STA may decode, using at least one decoder from among a set of multiple decoders of the STA in accordance with the duplicate data packet mode, the first data frame and the second data frame. The operations of block 1115 may be performed in accordance with examples as disclosed herein. In some implementations, aspects of the operations of block 1115 may be performed by a decoding component 935 as described with reference to FIG. 9.

In some implementations, in block 1120, the wireless STA may transmit, associated at least in part with the decoding, a feedback message responsive to at least a portion of the first data frame, the second data frame, or both. The operations of block 1120 may be performed in accordance with examples as disclosed herein. In some implementations, aspects of the operations of block 1120 may be performed by a feedback component 940 as described with reference to FIG. 9.

Figure 12:
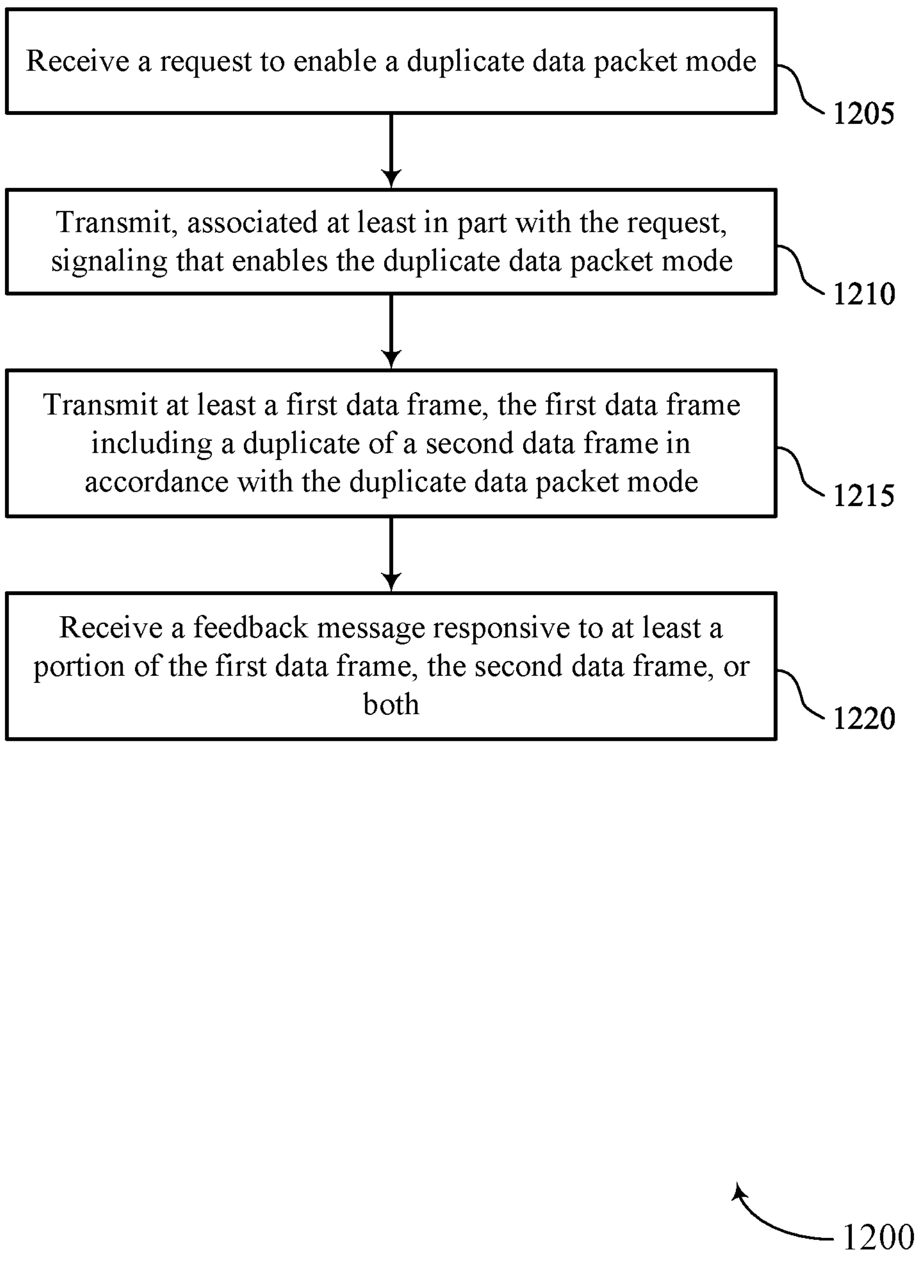

FIG. 12 shows a flowchart illustrating an example process 1200 performable at a wireless AP that supports packet duplication for data frames in a WLAN. The operations of the process 1200 may be an example of a method implemented by a wireless AP or its components as described herein. For example, the process 1200 may be performed by a wireless communication device, such as the wireless communication device 1000 described with reference to FIG. 10, operating as or within a wireless AP. In some implementations, the process 1200 may be performed by a wireless AP, such as one of the APs 102 described with reference to FIG. 1.

In some implementations, in block 1205, the wireless AP may receive a request to enable a duplicate data packet mode. The operations of block 1205 may be performed in accordance with examples as disclosed herein. In some implementations, aspects of the operations of block 1205 may be performed by a duplicate data packet mode component 1025 as described with reference to FIG. 10.

In some implementations, in block 1210, the wireless AP may transmit, associated at least in part with the request, signaling that enables the duplicate data packet mode. The operations of block 1210 may be performed in accordance with examples as disclosed herein. In some implementations, aspects of the operations of block 1210 may be performed by a duplicate data packet mode component 1025 as described with reference to FIG. 10.

In some implementations, in block 1215, the wireless AP may transmit at least a first data frame, the first data frame including a duplicate of a second data frame in accordance with the duplicate data packet mode. The operations of block 1215 may be performed in accordance with examples as disclosed herein. In some implementations, aspects of the operations of block 1215 may be performed by a data frame component 1030 as described with reference to FIG. 10.

In some implementations, in block 1220, the wireless AP may receive a feedback message responsive to at least a portion of the first data frame, the second data frame, or both. The operations of block 1220 may be performed in accordance with examples as disclosed herein. In some implementations, aspects of the operations of block 1220 may be performed by a feedback component 1035 as described with reference to FIG. 10.

Implementation examples are described in the following numbered clauses:

The following provides an overview of aspects of the present disclosure:

Aspect 1: A method for wireless communication at a STA, comprising: activating a duplicate data packet mode; receiving a first data frame and a second data frame, the second data frame comprising a duplicate of the first data frame upon activation of a duplicate data packet mode; decoding, using at least one decoder from among a plurality of decoders of the STA in accordance with the duplicate data packet mode, the first data frame and the second data frame; and transmitting, associated at least in part with the decoding, a feedback message responsive to at least a portion of the first data frame, the second data frame, or both.

Aspect 2: The method of aspect 1, wherein activating the duplicate data packet mode comprises: activating a non-HT duplicate data packet mode, the first data frame and the second data frame comprising non-HT PPDUs in accordance with the non-HT duplicate data packet mode.

Aspect 3: The method of aspect 1, wherein activating the duplicate data packet mode comprises: activating a UHR duplicate data packet mode, the first data frame and the second data frame comprising UHR PPDUs in accordance with the duplicate data packet mode.

Aspect 4: The method of aspect 3, wherein the UHR PPDUs comprise a PHY header including one or more IDs; the UHR PPDUs support MPDU aggregation; and the UHR PPDUs support a first maximum payload size that is larger than a second maximum payload size supported by non-HT PPDUs.

Aspect 5: The method of any of aspects 3 through 4, further comprising: receiving a third data frame, the third data frame being a UHR PPDU comprising a PHY header, the PHY header including an ID of a device; and dropping the third data frame associated at least in part with the PHY header being addressed to the device that is different than the STA.

Aspect 6: The method of any of aspects 1 through 5, further comprising: exchanging, in accordance with a duplicate mode negotiation procedure, one or more frames that are configured to enable or disable the duplicate data packet mode, the one or more frames comprising control frames or management frames; and activating the duplicate data packet mode associated at least in part with the one or more frames.

Aspect 7: The method of any of aspects 1 through 5, further comprising: receiving, via the second data frame, one or more bits that indicate the second data frame is the duplicate of the first data frame in accordance with the duplicate data packet mode.

Aspect 8: The method of any of aspects 1 through 7, further comprising: activating, associated at least in part with activating the duplicate data packet mode at the STA, one or more of the plurality of decoders of the STA.

Aspect 9: The method of any of aspects 1 through 8, wherein receiving the first data frame and the second data frame comprises: receiving, via the first data frame, a first plurality of A-MSDUs and a first plurality of check sequences, each check sequence of the first plurality of check sequences appended to a respective A-MSDU of the first plurality of A-MSDUs; and receiving, via the second data frame, a second plurality of A-MSDUs and a second plurality of check sequences, each check sequence of the second plurality of check sequences appended to a respective A-MSDU of the second plurality of A-MSDUs.

Aspect 10: The method of any of aspects 1 through 9, wherein receiving the first data frame and the second data frame comprises: receiving, via the first data frame, a first plurality of A-MSDU subframes comprising data and one or more first null A-MSDU subframes interleaved with the first plurality of A-MSDU subframes, the decoding of the first data frame performed at least in part during the one or more first null A-MSDU subframes; and receiving, via the second data frame, a second plurality of A-MSDU subframes comprising data and one or more second null A-MSDU subframes interleaved with the second plurality of A-MSDU subframes, the decoding of the second data frame performed at least in part during the one or more second null A-MSDU subframes.

Aspect 11: The method of any of aspects 1 through 10, wherein receiving the first data frame and the second data frame comprises: receiving the first data frame via a first frequency range and the second data frame via a second frequency range, the first frequency range and the second frequency range being within an operating bandwidth of the STA.

Aspect 12: The method of any of aspects 1 through 10, wherein receiving the first data frame and the second data frame comprises: receiving the first data frame via a first communication link, the first data frame comprising a first signal field that indicates a duration; and receiving the second data frame via a second communication link different than the first communication link, the second data frame comprising a second signal field that indicates the duration associated at least in part with the second data frame comprising the duplicate of the first data frame.

Aspect 13: The method of any of aspects 1 through 10, wherein receiving the first data frame and the second data frame comprises: receiving the first data frame from a first AP, the first data frame comprising a first signal field that indicates a duration; and receiving the second data frame from a second AP different than the first AP, the second data frame comprising a second signal field that indicates the duration associated at least in part with the second data frame comprising the duplicate of the first data frame.

Aspect 14: The method of any of aspects 1 through 13, wherein decoding the first data frame, the second data frame, or both comprises: decoding the first data frame using a first decoder of the plurality of decoders of the STA; and decoding the second data frame using a second decoder of the plurality of decoders of the STA.

Aspect 15: The method of aspect 14, wherein transmitting the feedback message comprises: transmitting a positive ACK associated at least in part with at least one of the first data frame or the second data frame being decoded successfully and the second decoder operating independently from the first decoder in accordance with the duplicate data packet mode being an independent decoding mode; or transmitting a NACK associated at least in part with a failure to decode either of the first data frame and the second data frame and the second decoder operating independently from the first decoder in accordance with the independent decoding mode.

Aspect 16: The method of aspect 14, wherein transmitting the feedback message comprises: transmitting a positive ACK associated at least in part with combined decoding of the first data frame and the second data frame being successful and the second decoder operating cooperatively with the first decoder in accordance with the duplicate data packet mode being a combined decoding mode; or transmitting a NACK associated at least in part with the combined decoding of the first data frame and the second data frame failing and the second decoder operating cooperatively with the first decoder in accordance with the combined decoding mode.

Aspect 17: The method of any of aspects 14 through 16, wherein the first decoder is associated with decoding data received via a first frequency range and the second decoder is associated with decoding data received via a second frequency range.

Aspect 18: The method of any of aspects 14 through 17, wherein the first decoder exchanges information with the second decoder in accordance with the duplicate data packet mode being a combined decoding mode.

Aspect 19: The method of any of aspects 1 through 18, wherein decoding the first data frame, the second data frame, or both comprises: decoding the first data frame associated at least in part with a first signal strength indicator associated with a first frequency range comprising the first data frame being greater than a second signal strength indicator associated with a second frequency range comprising the second data frame, the feedback message responsive to the first data frame in accordance with the decoding.

Aspect 20: The method of any of aspects 1 through 19, further comprising: transmitting a request to enable the duplicate data packet mode; and receiving, associated at least in part with the request, signaling that enables the duplicate data packet mode, activating the duplicate data packet mode being associated at least in part with the signaling.

Aspect 21: The method of any of aspects 1 through 20, further comprising: transmitting a second feedback message comprising a duplicate of the feedback message in accordance with the duplicate data packet mode.

Aspect 22: A method for wireless communication at an AP, comprising: receiving a request to enable a duplicate data packet mode; transmitting, associated at least in part with the request, signaling that enables the duplicate data packet mode; transmitting at least a first data frame, the first data frame comprising a duplicate of a second data frame in accordance with the duplicate data packet mode; and receiving a feedback message responsive to at least a portion of the first data frame, the second data frame, or both.

Aspect 23: The method of aspect 22, wherein transmitting the signaling comprises: transmitting the signaling to enable a non-HT duplicate data packet mode, the first data frame and the second data frame comprising non-HT PPDUs in accordance with the non-HT duplicate data packet mode.

Aspect 24: The method of aspect 22, wherein transmitting the signaling comprises: transmitting the signaling to enable a UHR duplicate data packet mode, the first data frame and the second data frame comprising UHR PPDUs in accordance with the duplicate data packet mode.

Aspect 25: The method of aspect 24, wherein the UHR PPDUs comprise a PHY header including one or more IDs; the UHR PPDUs support MPDU aggregation; and the UHR PPDUs support a first maximum payload size that is larger than a second maximum payload size supported by non-HT PPDUs.

Aspect 26: The method of any of aspects 22 through 25, wherein transmitting the signaling comprises: transmitting a management frame or a control frame that enables the duplicate data packet mode.

Aspect 27: The method of any of aspects 22 through 26, wherein transmitting the first data frame comprises: transmitting, via the first data frame, one or more bits that indicate the first data frame is a duplicate data frame associated at least in part with the second data frame being the duplicate of the first data frame and the duplicate data packet mode.

Aspect 28: The method of any of aspects 22 through 27, wherein transmitting the first data frame comprises: transmitting, via the first data frame, a first plurality of A-MSDUs and a first plurality of check sequences, each check sequence of the first plurality of check sequences appended to a respective A-MSDU of the first plurality of A-MSDUs.

Aspect 29: The method of any of aspects 22 through 28, wherein transmitting the first data frame comprises: transmitting, via the first data frame, a first plurality of A-MSDU subframes comprising data and one or more first null A-MSDU subframes interleaved with the first plurality of A-MSDU subframes.

Aspect 30: The method of any of aspects 22 through 29, further comprising: transmitting the second data frame via a second frequency range, the first data frame transmitted via a first frequency range, the first frequency range and the second frequency range being within an operating bandwidth of the AP.

Aspect 31: The method of any of aspects 22 through 29, further comprising: transmitting the second data frame via a second communication link, the first data frame transmitted via a first communication link different than the second communication link and comprising a first signal field that indicates a duration, the second data frame comprising a second signal field that indicates the duration associated at least in part with the second data frame comprising the duplicate of the first data frame.

Aspect 32: The method of any of aspects 22 through 29, wherein the second data frame is associated with a second AP different than the AP.

Aspect 33: An apparatus for wireless communication at a STA, comprising: processor; and memory coupled to the processor, the processor and memory operable to cause the apparatus to perform a method of any of aspects 1 through 21.

Aspect 34: An apparatus for wireless communication at a STA, comprising at least one means for performing a method of any of aspects 1 through 21.

Aspect 35: A non-transitory computer-readable medium storing code for wireless communication at a STA, the code comprising instructions executable by a processor to perform a method of any of aspects 1 through 21.

Aspect 36: An apparatus for wireless communication at an AP, comprising: processor; and memory coupled to the processor, the processor and memory operable to cause the apparatus to perform a method of any of aspects 22 through 32.

Aspect 37: An apparatus for wireless communication at an AP, comprising at least one means for performing a method of any of aspects 22 through 32.

Aspect 38: A non-transitory computer-readable medium storing code for wireless communication at an AP, the code comprising instructions executable by a processor to perform a method of any of aspects 22 through 32.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, measuring, and the like. Also, "determining" can include receiving (such as receiving information), accessing (such as accessing data stored in memory), transmitting (such as transmitting information) and the like. Also, "determining" can include resolving, selecting, obtaining, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b.

As used herein, "based on" is intended to be interpreted in the inclusive sense, unless otherwise explicitly indicated. For example, "based on" may be used interchangeably with "based at least in part on," "associated with", or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, measuring, and the like. Also, "determining" can include receiving (such as receiving information), accessing (such as accessing data stored in memory), transmitting (such as transmitting information) and the like. Also, "determining" can include resolving, selecting, obtaining, choosing, establishing and other such similar actions.

The various illustrative components, logic, logical blocks, modules, circuits, operations and algorithm processes described in connection with the examples disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation.

Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. An apparatus for wireless communication at a station, comprising:
- a processor; and
- memory coupled to the processor, the processor and memory operable to cause the apparatus to:
  - activate a duplicate data packet mode;
  - receive a first data frame and a second data frame, the second data frame comprising a duplicate of the first data frame upon activation of the duplicate data packet mode;
  - decode, using at least one decoder from among a plurality of decoders of the station in accordance with the duplicate data packet mode, the first data frame and the second data frame;
  - transmit, associated at least in part with the decoding, a feedback message responsive to at least a portion of the first data frame, the second data frame, or both;
  - activate an ultra-high reliability duplicate data packet mode, the first data frame and the second data frame comprising ultra-high reliability physical layer protocol data units in accordance with the duplicate data packet mode;
  - the ultra-high reliability physical layer protocol data units comprise a physical layer header including one or more identifiers;
- the ultra-high reliability physical layer protocol data units support medium access control protocol data unit aggregation; and
  - the ultra-high reliability physical layer protocol data units support a first maximum payload size that is larger than a second maximum payload size supported by non-high throughput physical layer protocol data units.

2. The apparatus of claim 1, wherein the processor and memory are further operable to cause the apparatus to:
- activate a non-high throughput duplicate data packet mode, the first data frame and the second data frame comprising non-high throughput physical layer protocol data units in accordance with the non-high throughput duplicate data packet mode.

3. The apparatus of claim 1, wherein the processor and memory are further operable to cause the apparatus to:
- receive a third data frame, the third data frame being an ultra-high reliability physical layer protocol data unit comprising a physical layer header, the physical layer header including an identifier of a device; and
- drop the third data frame associated at least in part with the physical layer header being addressed to the device that is different than the station.

4. The apparatus of claim 1, wherein the processor and memory are further operable to cause the apparatus to:
- exchange, in accordance with a duplicate mode negotiation procedure, one or more frames that are configured to enable or disable the duplicate data packet mode, the one or more frames comprising control frames or management frames; and
- activate the duplicate data packet mode associated at least in part with the one or more frames.

5. The apparatus of claim 1, wherein the processor and memory are further operable to cause the apparatus to:
- receive, via a physical layer header included in the second data frame, one or more bits that indicate the second data frame is the duplicate of the first data frame in accordance with the duplicate data packet mode.

6. The apparatus of claim 1, wherein the processor and memory are further operable to cause the apparatus to:
- activate, upon activation of the duplicate data packet mode at the station, one or more auxiliary decoders of the plurality of decoders of the station.

7. The apparatus of claim 1, wherein the processor and memory are further operable to cause the apparatus to:
- receive, via the first data frame, a first plurality of aggregated medium access control service data units and a first plurality of check sequences, each check sequence of the first plurality of check sequences appended to a respective aggregated medium access control service data unit of the first plurality of aggregated medium access control service data units; and
- receive, via the second data frame, a second plurality of aggregated medium access control service data units and a second plurality of check sequences, each check sequence of the second plurality of check sequences appended to a respective aggregated medium access control service data unit of the second plurality of aggregated medium access control service data units.

8. The apparatus of claim 1, wherein the processor and memory are further operable to cause the apparatus to:
- receive, via the first data frame, a first plurality of aggregated medium access control service data unit subframes comprising data and one or more first null aggregated medium access control service data unit subframes interleaved with the first plurality of aggregated medium access control service data unit subframes, the decoding of the first data frame performed at least in part during the one or more first null aggregated medium access control service data unit subframes; and
- receive, via the second data frame, a second plurality of aggregated medium access control service data unit subframes comprising data and one or more second null aggregated medium access control service data unit subframes interleaved with the second plurality of aggregated medium access control service data unit subframes, the decoding of the second data frame performed at least in part during the one or more second null aggregated medium access control service data unit subframes.

9. The apparatus of claim 1, wherein the processor and memory are further operable to cause the apparatus to:

receive the first data frame from a first access point, the first data frame comprising a first signal field that indicates a duration; and receive the second data frame from a second access point different than the first access point, the second data frame comprising a second signal field that indicates the duration associated at least in part with the second data frame comprising the duplicate of the first data frame.

10. The apparatus of claim 1, wherein the processor and memory are further operable to cause the apparatus to:

decode the first data frame using a first decoder of the plurality of decoders of the station; and decode the second data frame using a second decoder of the plurality of decoders of the station.

11. The apparatus of claim 10, wherein the processor and memory are further operable to cause the apparatus to:

transmit a positive acknowledgement associated at least in part with at least one of the first data frame or the second data frame being decoded successfully and the second decoder operating independently from the first decoder in accordance with the duplicate data packet mode being an independent decoding mode; or transmit a negative acknowledgement associated at least in part with a failure to decode either of the first data frame and the second data frame and the second decoder operating independently from the first decoder in accordance with the independent decoding mode.

12. The apparatus of claim 10, wherein the processor and memory are further operable to cause the apparatus to:

transmit a positive acknowledgement associated at least in part with combined decoding of the first data frame and the second data frame being successful and the second decoder operating cooperatively with the first decoder in accordance with the duplicate data packet mode being a combined decoding mode; or transmit a negative acknowledgement associated at least in part with the combined decoding of the first data frame and the second data frame failing and the second decoder operating cooperatively with the first decoder in accordance with the combined decoding mode.

13. The apparatus of claim 10, wherein the first decoder is associated with decoding data received via a first frequency range and the second decoder is associated with decoding data received via a second frequency range.

14. The apparatus of claim 10, wherein the first decoder exchanges information with the second decoder in accordance with the duplicate data packet mode being a combined decoding mode.

15. The apparatus of claim 1, wherein the processor and memory are further operable to cause the apparatus to:

decode the first data frame associated at least in part with a first signal strength indicator associated with a first frequency range comprising the first data frame being greater than a second signal strength indicator associated with a second frequency range comprising the second data frame, the feedback message responsive to the first data frame in accordance with the decoding.

16. An apparatus for wireless communication at an access point, comprising:

a processor; and memory coupled to the processor, the processor and memory operable to cause the apparatus to:

receive a request to enable a duplicate data packet mode;

transmit, associated at least in part with the request, signaling that enables the duplicate data packet mode;

transmit at least a first data frame, the first data frame comprising a duplicate of a second data frame in accordance with the duplicate data packet mode;

receive a feedback message responsive to at least a portion of the first data frame, the second data frame, or both; and transmit, via the first data frame, a first plurality of aggregated medium access control service data units and a first plurality of check sequences, each check sequence of the first plurality of check sequences appended to a respective aggregated medium access control service data unit of the first plurality of aggregated medium access control service data units.

17. The apparatus of claim 16, wherein the processor and memory are further operable to cause the apparatus to:

transmit the second data frame via a second communication link, the first data frame transmitted via a first communication link different than the second communication link and comprising a first signal field that indicates a duration, the second data frame comprising a second signal field that indicates the duration associated at least in part with the second data frame comprising the duplicate of the first data frame.

18. The apparatus of claim 16, wherein the processor and memory are further operable to cause the apparatus to:

receive a second feedback message comprising a duplicate of the feedback message in accordance with the duplicate data packet mode;

decode the feedback message using a first decoder of the access point; and decode the second feedback message using a second decoder of the access point.

19. A method for wireless communication at a station, comprising:

activating a duplicate data packet mode;

receiving a first data frame and a second data frame, the second data frame comprising a duplicate of the first data frame upon activation of the duplicate data packet mode;

decoding, using at least one decoder from among a plurality of decoders of the station in accordance with the duplicate data packet mode, the first data frame and the second data frame;

transmitting, associated at least in part with the decoding, a feedback message responsive to at least a portion of the first data frame, the second data frame, or both; and wherein receiving the first data frame and the second data frame comprises:

receiving the first data frame via a first communication link, the first data frame comprising a first signal field that indicates a duration; and receiving the second data frame via a second communication link different than the first communication link, the second data frame comprising a second signal field that indicates the duration associated at least in part with the second data frame comprising the duplicate of the first data frame.

20. The method of claim 19, further comprising:

exchanging, in accordance with a duplicate mode negotiation procedure, one or more frames that are configured to enable or disable the duplicate data packet mode, the one or more frames comprising control frames or management frames; and activating the duplicate data packet mode associated at least in part with the one or more frames.

21. The method of claim 19, further comprising:

receiving, via the second data frame, one or more bits that indicate the second data frame is the duplicate of the first data frame in accordance with the duplicate data packet mode.

22. A method for wireless communication at an access point, comprising:

receiving a request to enable a duplicate data packet mode;

transmitting, associated at least in part with the request, signaling that enables the duplicate data packet mode;

transmitting at least a first data frame, the first data frame comprising a duplicate of a second data frame in accordance with the duplicate data packet mode;

receiving a feedback message responsive to at least a portion of the first data frame, the second data frame, or both;

wherein transmitting the signaling comprises:

transmitting the signaling to enable an ultra-high reliability duplicate data packet mode, the first data frame and the second data frame comprising ultra-high reliability physical layer protocol data units in accordance with the duplicate data packet mode;

wherein the ultra-high reliability physical layer protocol data units comprise a physical layer header including one or more identifiers;

the ultra-high reliability physical layer protocol data units support medium access control protocol data unit aggregation; and the ultra-high reliability physical layer protocol data units support a first maximum payload size that is larger than a second maximum payload size supported by non-high throughput physical layer protocol data units.

* * * * *